US011774048B2

(12) United States Patent
Nishi et al.

(10) Patent No.: US 11,774,048 B2
(45) Date of Patent: Oct. 3, 2023

(54) LIGHT SOURCE APPARATUS AND PROJECTION DISPLAY APPARATUS

(71) Applicant: SONY GROUP CORPORATION, Tokyo (JP)

(72) Inventors: Shota Nishi, Tokyo (JP); Takeharu Takasawa, Tokyo (JP); Masahiro Ishige, Tokyo (JP)

(73) Assignee: Sony Group Corporation, Tokyo (JP)

( * ) Notice: Subject to any disclaimer, the term of this patent is extended or adjusted under 35 U.S.C. 154(b) by 3 days.

(21) Appl. No.: 17/615,913

(22) PCT Filed: May 26, 2020

(86) PCT No.: PCT/JP2020/020763
§ 371 (c)(1),
(2) Date: Dec. 2, 2021

(87) PCT Pub. No.: WO2020/250668
PCT Pub. Date: Dec. 17, 2020

(65) Prior Publication Data
US 2022/0316661 A1    Oct. 6, 2022

(30) Foreign Application Priority Data
Jun. 10, 2019    (JP) ................... 2019-108135

(51) Int. Cl.
*F21K 9/64*       (2016.01)
*F21V 29/503*   (2015.01)
*G03B 21/20*    (2006.01)

(52) U.S. Cl.
CPC .............. *F21K 9/64* (2016.08); *F21V 29/503* (2015.01); *G03B 21/20* (2013.01)

(58) Field of Classification Search
CPC ........ F21K 9/64; F21V 29/503; F21V 29/502; F21V 29/74; F21V 29/717; F21V 7/05;
(Continued)

(56) References Cited

U.S. PATENT DOCUMENTS

2016/0178289 A1* 6/2016 Gonzalez .............. H01L 23/467
                                                              165/80.3
2017/0293211 A1* 10/2017 Kobayashi ............. G03B 21/16
2019/0369469 A1   12/2019 Ishige et al.

FOREIGN PATENT DOCUMENTS

JP      2009-123721      6/2009
JP      2016-528743      9/2016
(Continued)

OTHER PUBLICATIONS

International Search Report prepared by the Japan Patent Office dated Jun. 17, 2020, for International Application No. PCT/JP2020/020763, 2 pgs.

*Primary Examiner* — Anne M Hines
*Assistant Examiner* — Jose M Diaz
(74) *Attorney, Agent, or Firm* — Sheridan Ross PC

(57) ABSTRACT

A light source apparatus according to an embodiment of the present disclosure includes: a supporting substrate including a phosphor layer on one surface; a driver that causes the supporting substrate to be rotationally driven; a first supporting member that is opposed to another surface opposite to the one surface of the supporting substrate; a plurality of first heat dissipation members each having heat dissipation performance different from each other depending on a distance from the phosphor layer, the plurality of first heat dissipation members being provided concentrically on the other surface of the supporting substrate; and a plurality of second heat dissipation members provided concentrically on a surface, of the first supporting member, that is opposed to the supporting substrate, the plurality of second heat dissipation members being disposed alternately with the plurality of first heat dissipation members.

20 Claims, 18 Drawing Sheets

(58) Field of Classification Search
CPC .. F21V 7/26; F21V 9/32; G03B 21/20; G03B 21/006; G03B 21/16; G03B 21/2033; G03B 21/204; G03B 21/2066; G03B 21/2073; H04N 5/74
See application file for complete search history.

(56) References Cited

FOREIGN PATENT DOCUMENTS

| | | |
|---|---|---|
| JP | 2018-004668 | 1/2018 |
| WO | WO 2018/116689 | 6/2018 |

\* cited by examiner

LIGHT SOURCE APPARATUS AND PROJECTION DISPLAY APPARATUS

CROSS REFERENCE TO RELATED APPLICATIONS

This application is a national stage application under 35 U.S.C. 371 and claims the benefit of PCT Application No. PCT/JP2020/020763 having an international filing date of 26 May 2020, which designated the United States, which PCT application claimed the benefit of Japanese Patent Application No. 2019-108135 filed 10 Jun. 2019, the entire disclosures of each of which are incorporated herein by reference.

TECHNICAL FIELD

The present disclosure relates to: a light source apparatus that includes, as a wavelength converter, a rotator including a phosphor layer as a light emission unit; and a projection display apparatus including the light source apparatus.

BACKGROUND ART

In recent years, a laser-phosphor system light source apparatus has been used as a light source of a projector. In the laser-phosphor system light source apparatus, a method has been adopted in which a wheel to which a phosphor is fixed is contained in a sealed housing, in order to prevent deterioration of output or breakage due to dust. In such a light source apparatus, for example, a light source apparatus is disclosed in which a plurality of concentric heat dissipation members provided on a sealed housing and a plurality of concentric heat dissipation members provided on a wheel side are combined (for example, see PTL 1). In such a light source apparatus, heat conductivity between the heat dissipation members is improved and a light emission unit of the phosphor is efficiently cooled by utilizing a Taylor vortex generated between the heat dissipation members when the wheel side is rotationally driven.

CITATION LIST

Patent Literature

PTL 1: International Publication No. WO 2018/116689

SUMMARY OF THE INVENTION

For a light source apparatus of a projector, increased light source power and miniaturization are desired, and a further improvement in heat dissipation efficiency is desired.

It is desirable to provide a light source apparatus and a projection display apparatus that make it possible to improve heat dissipation efficiency.

A light source apparatus according to an embodiment of the present disclosure includes: a supporting substrate including a phosphor layer on one surface; a driver that causes the supporting substrate to be rotationally driven; a first supporting member that is opposed to another surface opposite to the one surface of the supporting substrate; a plurality of first heat dissipation members each having heat dissipation performance different from each other depending on a distance from the phosphor layer, the plurality of first heat dissipation members being provided concentrically on the other surface of the supporting substrate; and a plurality of second heat dissipation members provided concentrically on a surface, of the first supporting member, that is opposed to the supporting substrate, the plurality of second heat dissipation members being disposed alternately with the plurality of first heat dissipation members.

A projection display apparatus according to an embodiment of the present disclosure includes: a light source apparatus; an image generation optical system that modulates light from the light source apparatus on the basis of an inputted image signal to generate image light; and a projection optical system that projects the image light generated in the image generation optical system. The light source apparatus included in the projection display apparatus includes the same components as those in the foregoing light source apparatus according to the embodiment of the present disclosure.

In the light source apparatus according to the embodiment of the present disclosure and the projection display apparatus according to the embodiment of the present disclosure, the plurality of concentric first heat dissipation members each having heat dissipation performance different from each other depending on a distance from the phosphor layer is provided on a back surface (the other surface) of the supporting substrate including the phosphor layer. Specifically, a heat dissipation member having higher heat dissipation performance is disposed with decrease in the distance from the phosphor layer. This lowers a temperature of the phosphor layer owing to a thermal diffusion effect, while suppressing increase in weight.

MODES FOR CARRYING OUT THE INVENTION

Figure 1:
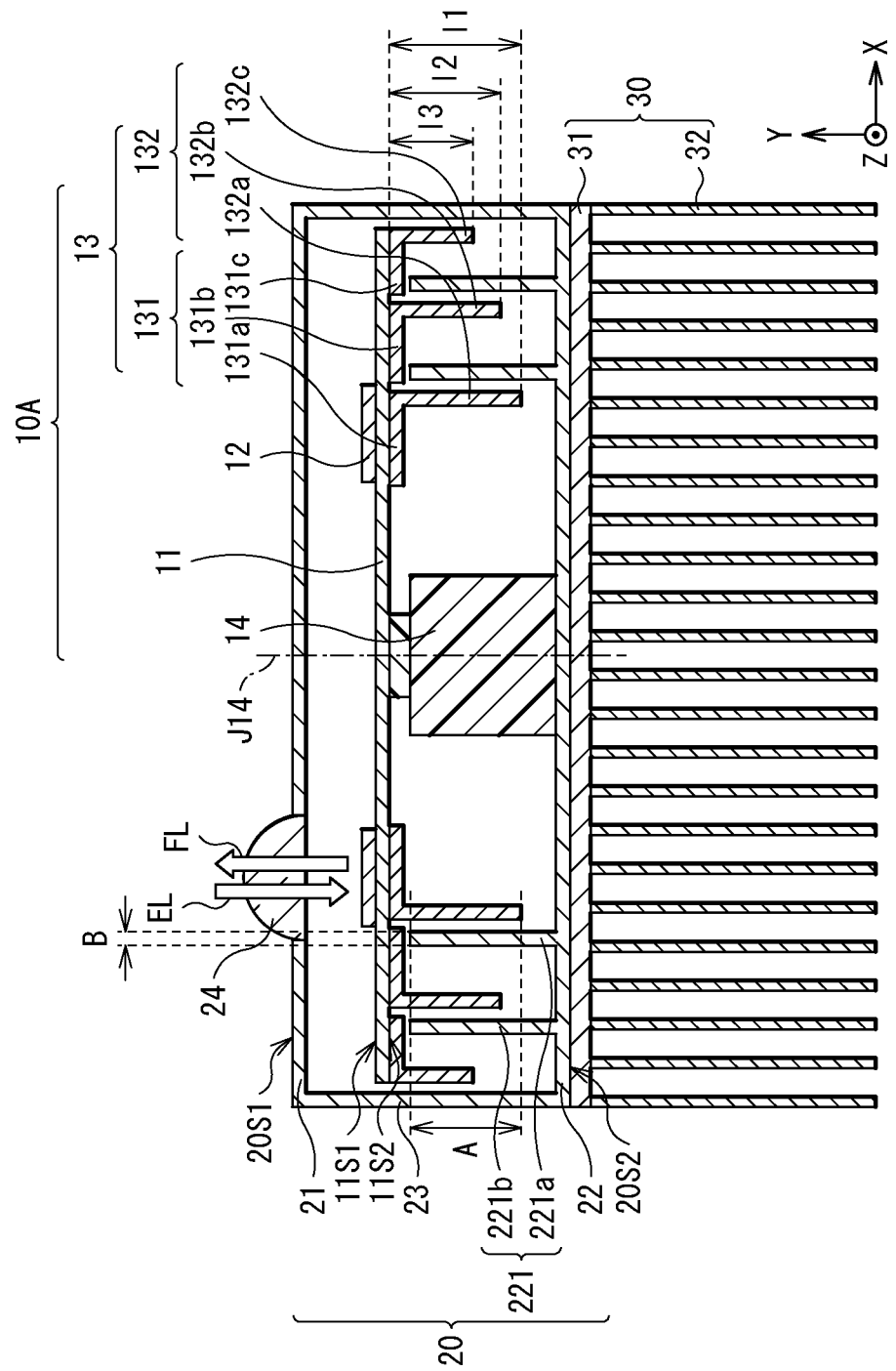
FIG. 1 is a cross-sectional schematic view of an example of configurations of a phosphor wheel and a housing included in a light source apparatus according to a first embodiment of the present disclosure.

The following describes embodiments of the present disclosure in detail with reference to the drawings. The following description is a specific example of the present disclosure, but the present disclosure is not limited to the following embodiments. In addition, the present disclosure is not limited to arrangement, dimensions, dimensional ratios, and the like of the constituent elements illustrated in the drawings. It is to be noted that description is given in the following order.

1. First Embodiment (an example in which a plurality of heat dissipation members each having heat dissipation performance different from each other depending on a distance from a phosphor layer is disposed on a back surface of a wheel substrate)
    1-1. Configurations of Phosphor Wheel and Its Surroundings
    1-2. Method of Manufacturing Phosphor Wheel
    1-3. Configuration of Light Source Apparatus
    1-4. Workings and Effects
2. Second Embodiment (an example of a phosphor wheel including a plurality of heat dissipation members each having a fin whose thickness is different from each other)
3. Third Embodiment (an example of a phosphor wheel including a plurality of heat dissipation members each having a fin whose length and thickness are different from each other)
4. Modification Examples
    4-1. Modification Example 1 (an example in which a plurality of heat dissipation members is formed in an integrated manner)
    4-2. Modification Example 2 (an example in which an outermost heat dissipation member is provided integrally with a wheel substrate)
    4-3. Modification Example 3 (an example in which a plurality of heat dissipation members is formed in an integrated manner with a wheel substrate)
    4-4. Modification Example 4 (an example in which another heat dissipation member is further provided on an inner circumference as compared to a phosphor layer)
    4-5. Modification Example 5 (an example in which a sloping surface is provided on a peripheral edge portion of a housing)
    4-6. Modification Example 6 (an example in which other heat dissipation members are further provided on a front surface of a wheel substrate)
    4-7. Modification Example 7 (an example of a transmissive phosphor wheel)
    4-8. Modification Example 8 (another configuration example of a light source apparatus)
5. Application Examples (projection display apparatuses)

1. First Embodiment

Figure 2A:
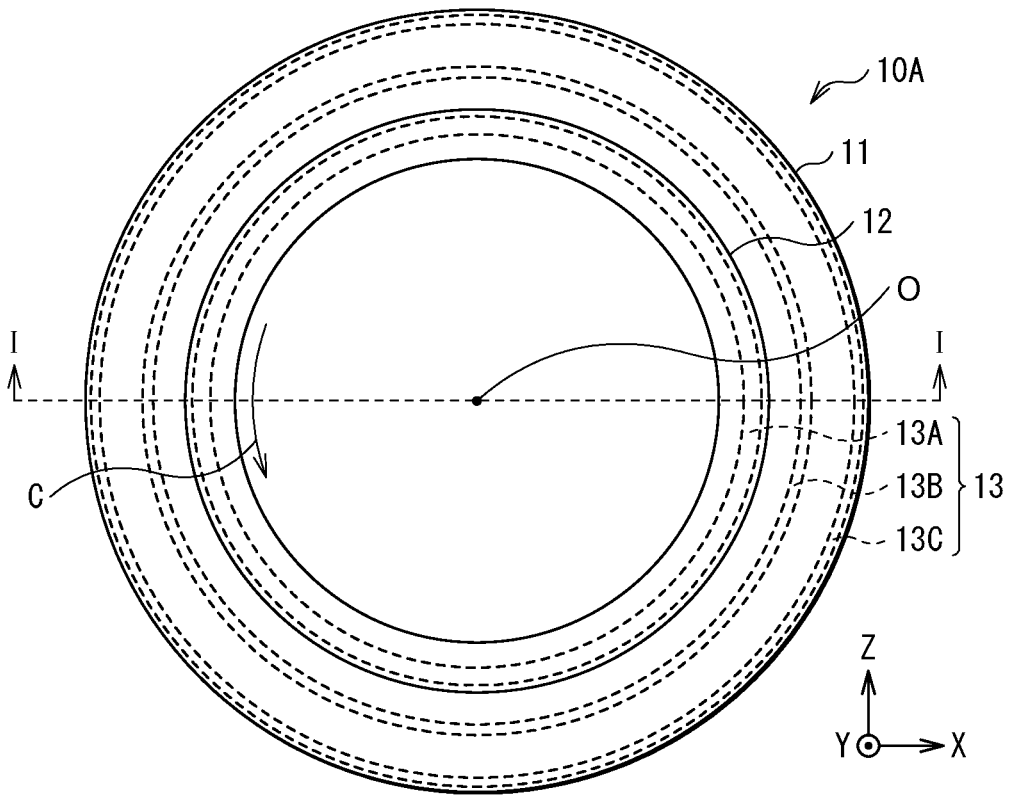
FIG. 2A is a plan schematic view of a case where the phosphor wheel illustrated in FIG. 1 is seen from a front surface side.
Figure 2B:
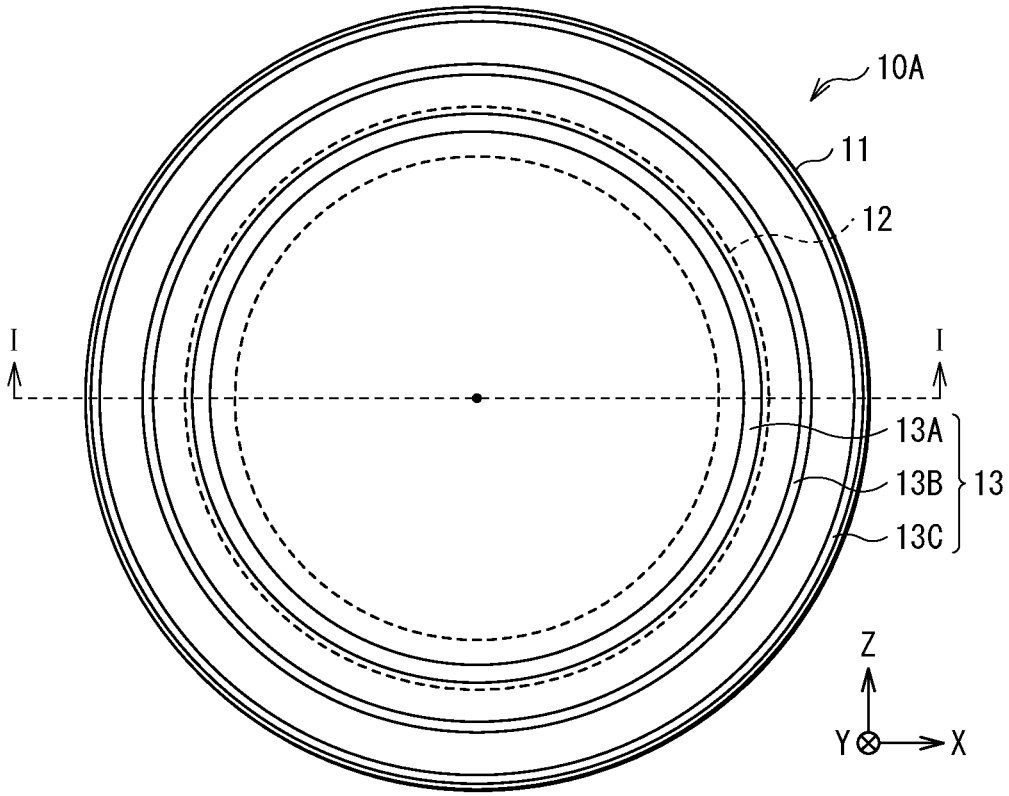
FIG. 2B is a plan schematic view of a case where the phosphor wheel illustrated in FIG. 1 is seen from a back surface side.

FIG. 1 schematically illustrates an example of cross-sectional configurations of a wavelength converter (a phosphor wheel 10A) and a housing 20 included in a light source apparatus (a light source apparatus 1) according to a first embodiment of the present disclosure. FIG. 2A schematically illustrates a planar configuration, seen from a front surface side, of a phosphor wheel 10A illustrated in FIG. 1. FIG. 2B schematically illustrates a planar configuration, seen from a back surface side, of the phosphor wheel 10A illustrated in FIG. 1. FIG. 1 illustrates a cross-sectional configuration taken along a line I-I illustrated in FIGS. 2A and 2B. Further, FIGS. 2A and 2B each illustrate portions of respective fins 132a, 132b, and 132c of heat dissipation members 13A, 13B, and 13C. The phosphor wheel 10A is to be used as, for example, a light-emitting device (a wavelength converter) included in a light source apparatus (e.g., a light source apparatus 1) of a projection display apparatus (a projector 1000) to be described later (e.g., see FIGS. 6 and 18).

The light source apparatus 1 according to the present embodiment includes: the phosphor wheel 10A that converts a wavelength of excitation light EL (e.g., blue light) outputted from a light source unit 1110 to be described later into a wavelength of fluorescence FL (e.g., yellow light) and outputs the wavelength-converted light; and a housing 20 that contains the phosphor wheel 10A. The phosphor wheel 10A has a phosphor layer 12 fixed to, for example, a front surface (one surface; a surface 11S1) of a wheel substrate 11 having a circular planar shape. On a back surface (another surface; a surface 11S2) is provided with a plurality of concentric heat dissipation members 13 centered on a center (O) of rotation of the wheel substrate 11. A plurality of heat dissipation members (a plurality of fins 221) is provided inside the housing 20. The plurality of heat dissipation members (the plurality of fins 221) is disposed in a nested manner with the plurality of heat dissipation members 13. In the present embodiment, three heat dissipation members 13A, 13B, and 13C each having heat dissipation performance different from each other are provided, as the plurality of heat dissipation members 13, on the back surface (the surface 11S2) of the wheel substrate 11 depending on the distances from the phosphor layer 12. It should be noted that FIGS. 1, 2A, and 2B each schematically illustrate configurations of the phosphor wheel 10A and the housing 20, and may differ from actual dimensions and shapes.

1-1. Configurations of Phosphor Wheel and its Surroundings

As described above, in the phosphor wheel 10A, the phosphor layer 12 is provided on the front surface (the surface 11S1) of the circular wheel substrate 11, and the two heat dissipation members 13A, 13B, and 13C are provided on the back surface (the surface 11S2) of the circular wheel substrate 11. The phosphor layer 12 is formed in an annular shape, for example, around a center O of rotation of the wheel substrate 11. The wheel substrate 11 is fixed to a motor 14, and is rotatable, for example, in an arrow C direction about an axis J14A passing through the center (O) of rotation, for example, during an operation of the light source apparatus 1. The phosphor wheel 10A is rotated in order to prevent a decrease in light conversion efficiency while suppressing a local increase in temperature with application of the excitation light EL and maintaining structure stability.

The wheel substrate 11 serves as a substrate that supports the phosphor layer 12, and also serves as a heat dissipation member. The wheel substrate 11 includes, for example, an inorganic material such as a metal material and a ceramic material. As a constituent material of the wheel substrate 11, a material having high heat conductivity is preferable. Specifically, examples of the metal material included in the wheel substrate 11 include simple substances of metals such as aluminum (Al), copper (Cu), molybdenum (Mo), tungsten (W), cobalt (Co), chromium (Cr), platinum (Pt), tantalum (Ta), lithium (Li), zirconium (Zr), ruthenium (Ru), rhodium (Rh) and palladium (Pd) or an alloy including one or more of the metals. Alternatively, as the metal material included in the wheel substrate 11, it is possible to use an alloy such as CuW containing 80 at % or more of W and CuMo containing 40 at % or more of Mo. Examples of the ceramic material include a ceramic material including silicon carbide (SiC), aluminum nitride (AlN), beryllium oxide (BeO), a composite material of Si and SiC, or a composite material of SiC and Al (in which the content of SiC is 50% or more). Moreover, in addition to a simple substance of Si, SiC, and a crystal material such as diamond or sapphire, it is also possible to use quartz and glass. In particular, as the constituent element of the wheel substrate 11, the simple substances of Mo, Si, and W are preferable, which have high heat conductivity.

The phosphor layer 12 the phosphor layer 12 includes a plurality of phosphor particles, and is fixed to the front surface (the surface S1) of the wheel substrate 11. The phosphor layer 12 is preferably formed in a plate-like shape, for example, and includes a so-called ceramic phosphor or a binder-type porous phosphor. The binder binds one phosphor particle to another phosphor particle adjacent to the one phosphor particle. The binder includes, for example, a cross-linked body of an inorganic material such as water glass. The water glass indicates a silicate compound that is also referred to as sodium silicate, potassium silicate, or silicate soda, and indicates a liquid in which anhydrous silicic acid ($SiO_2$) and sodium oxide ($Na_2O$) or potassium oxide ($K_2O$) are mixed at a predetermined ratio. Water glass is represented by a molecular formula of $Na_2O \cdot nSiO_2$.

The phosphor particles include a particulate phosphor that absorbs the excitation light EL (for example, laser light) applied from outside to emit fluorescence FL. For example, the phosphor particles include a fluorescent material that is excited by blue laser light having a wavelength in a blue wavelength range (for example, from 400 nm to 470 nm) to emit yellow fluorescence (light in a wavelength range between a red wavelength range and a green wavelength range). As such a fluorescent material, for example, YAG (yttrium aluminum garnet)-based material is used.

Figure 3:
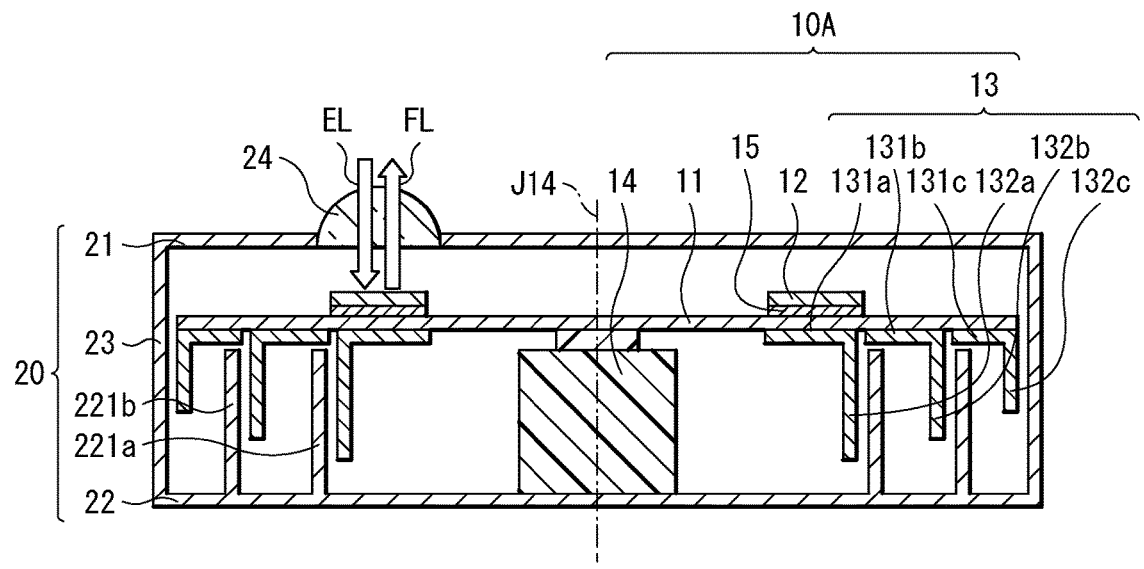
FIG. 3 is a cross-sectional schematic view of another example of the configurations of the phosphor wheel and the housing included in the light source apparatus according to the first embodiment of the present disclosure.

It is to be noted that, as illustrated in FIG. 3, the phosphor layer 12 may be fixed to the wheel substrate 11 with a reflection film 15 interposed therebetween, for example. The reflection film 15 functions to reflect the excitation light EL applied from outside and the fluorescence FL emitted from the phosphor layer 12, thereby enhancing light emission efficiency in the phosphor wheel 10A. The reflection film 15 includes, in addition to a dielectric multilayer film, a metal film including a metal element such as aluminum (Al), silver (Ag), or titanium (Ti), etc., for example. It is to be noted that in a case where the wheel substrate 11 includes a material having light reflectivity, the reflection film 15 may be omitted where appropriate.

As described above, in the phosphor wheel 10A, the three heat dissipation members 13A, 13B, and 13C are disposed, for example, as the plurality of heat dissipation members 13, on the back surface (the surface 11S2) of the wheel substrate 11. The heat dissipation members 13A, 13B, and 13C each correspond to a specific example of a "first heat dissipation member" of the present disclosure. As described above, the heat dissipation members 13A, 13B, and 13C each have heat dissipation performance different from each other, and are disposed depending on the distances from the phosphor layer 12. Specifically, the heat dissipation member 13A has the highest heat dissipation performance, the heat dissipation member 13B has the next highest heat dissipation performance, and the heat dissipation member 13C has the lowest heat dissipation performance. In the present embodiment, the heat dissipation member 13A having the highest heat dissipation performance is disposed nearest to the phosphor layer 12 that is to be a heat source, e.g., immediately below the phosphor layer 12 as illustrated in FIG. 1, and the heat dissipation member 13C having the lowest heat dissipation performance is disposed furthest from the phosphor layer 12, e.g., on a peripheral edge portion of the wheel substrate 11, as illustrated in FIG. 1. The heat dissipation members 13A, 13B, and 13C are disposed in this order from the center (O) of rotation of the wheel substrate 11.

The heat dissipation members 13A, 13B, and 13C include stationary portions 131 (131a, 131b, and 131c) bonded to the back surface (the surface 11S2) of the wheel substrate 11, and fins 132 (132a, 132b, and 132c) bent substantially parallel to a rotation axis J14 of the phosphor wheel 10A from the stationary portions 131. The heat dissipation members 13A, 13B, and 13C are bonded to the wheel substrate 11 via the stationary portion 131a, 131b, and 131c, respectively. As a result, the heat dissipation members 13A, 13B, and 13C are rotatable about the axis J14A, for example, together with the wheel substrate 11 during the operation of the light source apparatus 1. The fins 132a, 132b, and 132c are each bent in the direction substantially parallel to the rotation axis J14 of the phosphor wheel 10A, and each form a cylindrical surface substantially parallel to the rotation axis J14, as described above. The cylindrical surface is preferably formed as a continuous surface around the rotation axis J14 as a center, but may have, for example, an incision extending in a rotation axis direction at one or more spots.

In the present embodiment, the heat dissipation performance of each of the heat dissipation members 13A, 13B, and 13C is adjusted by the respective lengths of the fins 132a, 132b, and 132c, for example. Specifically, the heat dissipation members 13A, 13B, and 13C have the fin 132a having a length l1, the fin 132b having a length l2, and the fin 132c having a length l3, respectively, and a relationship of the lengths l1>l2>l3 is satisfied. Thus, the length of the fin 132a of the heat dissipation member 13A disposed closest to the phosphor layer 12 is made the longest and the lengths of the fins 132b and 132c are made shorter as the distance from the phosphor layer 12 increases. This makes it possible to reduce a weight of the phosphor wheel 10A while maintaining cooling efficiency of a heat generator (the phosphor layer 12) by the heat dissipation members 13A, 13B, and 13C.

The heat dissipation members 13A, 13B, and 13C each preferably include a material having high heat conductivity. Specifically, the heat dissipation members 13A, 13B, and 13C each desirably include, for example, pure aluminum, an aluminum alloy, a copper alloy such as beryllium copper, a carbon material, graphite, etc. It is to be noted that the heat dissipation members 13A, 13B, and 13C may include the same material, or may each include a material different from each other.

The housing 20 contains the phosphor wheel 10A including the heat dissipation members 13 and prevents dust from being attached to the phosphor wheel 10A. The housing 20 has a front face portion 21, a back face portion 22, and a side face portion 23. On the front face portion 21, a lens 24 is disposed at a position directly opposed to the phosphor layer 12 as a transmission section through which the excitation light EL and the fluorescence FL are transmitted. The back face portion 22 is provided with, for example, two fins 221a and 221b as the plurality of concentric fins 221 centered on, for example, the center (O) of rotation of the wheel substrate 11. That is, the back face portion 22 of the housing 20 corresponds to a "first supporting member" of the present disclosure, and the fins 221a and 221b each correspond to a specific example of a "second heat dissipation member" of the present disclosure.

The fins 221a and 221b are each formed integrally with the back face portion 22 in the same length and each form a cylindrical surface substantially parallel to the rotation axis J14 of the phosphor wheel 10A. The cylindrical surfaces of the fins 221a and 221b are each preferably formed as a continuous surface around the rotation axis J14 as a center in a similar manner as the fins 132a, 132b, and 132c of the heat dissipation members 13A, 13B, and 13C, but may have, for example, an incision extending in the rotation axis direction at one or more spots. That is, the fins 132a 132b, 132c of the heat dissipation members 13A, 13B, and 13C and the fins 221a and 221b have surfaces that are opposed to each other and are substantially parallel to each other.

In the present embodiment, the fins 221a and 221b are disposed in a nested manner with the fins 132a, 132b, and 132c of the heat dissipation members 13A, 13B, and 13C. Specifically, the fins 132a, 132b, and 132c and the fins 221a and 221b are disposed in the order of the fin 132a, the fin 221a, the fin 132b, the fin 221b, and the fin 132c from the center (O) of rotation of the wheel substrate 11.

The positions of the fins 132a 221a, 132b, 221b, and 132c are preferably disposed in such a manner that, for example, an aspect ratio (AB) of a distance (A) to a distance (B) is 2 or greater. The distance (A) is a distance of a portion of the respective surfaces of the fin 132a and the fin 221a that are opposed to each other and the distance (B) is a distance between the fin 132a and the fin 221a. Similarly, it is preferable that the aspect ratio of a distance of a portion of the respective surfaces of the fin 132b and the fin 221b that are opposed to each other to a distance between the fin 132b and the fin 221b be 2 or greater. As for the fin 132c, it is preferable that a distance of a portion of the respective surfaces of the fin 132c and the side face portion 23 of the housing 20 and a distance between the fin 132c and the side face portion 23 have a similar configuration.

As a result, when the phosphor wheel 10A is rotationally driven, a Taylor vortex is generated in fluid (for example, air) between the fin 132a and the fin 221a, between the fin 132b and the fin 221b, and between the fin 132c and the side face portion 23. The Taylor vortex is generated by the centrifugal force acting on the gas. For this reason, in the present embodiment, the fins combined to have the above-described aspect ratio have such a configuration that the fins (the fins 221) on the outer peripheral side are fixed and the fins (the fins 132) on the inner peripheral side are rotationally driven. Accordingly, the heat generated in the phosphor layer 12 and transferred from the wheel substrate 11 to the heat dissipation member 13 is efficiently transferred to the fins 221a and 221b, which makes it possible to efficiently cool the phosphor layer 12.

It is to be noted that an upper limit of the aspect ratio is preferably 10 or less, for example. This is because in a case where the aspect ratio exceeds 10, an effect of improving cooling performance is reduced. Moreover, this is because in a case where the aspect ratio is 10 or more, that is, a portion corresponding to the fin becomes larger, a level of difficulty in manufacturing the heat dissipation members 13A, 13B, and 13C and the housing 20 becomes higher.

It is preferable that the housing 20 include a material having high heat conductivity. Specifically, the housing 20 desirably includes, for example, pure aluminum, an aluminum alloy, a copper alloy such as beryllium copper or the like, etc.

It is to be noted that FIG. 1 illustrates, as the housing 20, a sealed housing in which the front face portion 21, the back face portion 22, and the side face portion 23 are bonded to each other and completely isolated from the outside; however, the housing 20 may be an open housing in which the front surface (surface 11S1) side of the wheel substrate 11 is opened. Further, in the present embodiment, the side face portion 23 is used as the surface opposed to the fin 132c of the heat dissipation member 13C disposed on the peripheral edge portion of the wheel substrate 11; however, another fin may be separately provided on the back face portion 22 as the surface opposed to the fin 132c.

In a case where the housing 20 has a sealed structure, the housing 20 may be filled with a gas having higher heat conductivity than air, in addition to air as fluid. Specifically, the housing 20 is preferably filled with a gas having higher heat conductivity than heat conductivity (heat conductivity of 0.0257 W/mK in an environment at 20° C.) of air. Examples of such a gas include helium (He). Not only the gas but also a liquid may be sealed in the housing 20. Examples of the liquid sealed in the housing 20 include water, a silicon oil, etc., and a liquid having lowest possible viscosity is preferably selected. It is to be noted that in a case where the liquid is sealed in the housing 20, it is possible to rotate the phosphor wheel 10A with use of magnet-driving.

Moreover, for example, a heat dissipation structure 30 may be provided outside the housing 20, as illustrated in FIG. 1. This makes it possible to improve heat exhaust efficiency in the housing 20. The heat dissipation structure 30 includes, for example, a supporting member 31 bonded to the back face (the surface S2) of the housing 20, and a plurality of fins 32 is mounted on the supporting member 31. The heat transferred from the phosphor wheel 10A to the housing 20 is diffused into air.

The heat dissipation structure 30 may have a configuration in which a plurality of heat pipes is mounted on the back face (the surface S2) of the housing 20, and a heat sink is coupled to ends of the heat pipes. Examples of other heat dissipation structures include a liquid cooling system. In the liquid cooling system, a pipe is mounted on, for example, a surface or a side surface of the housing 20, and a cooling medium flows in the pipe, which causes heat of the housing 20 to be transferred to the cooling medium, thereby cooling the housing 20. The heat transferred to the cooling medium is diverged into air by a radiator, etc.

1-2. Method of Manufacturing Phosphor Wheel

Figure 4A:
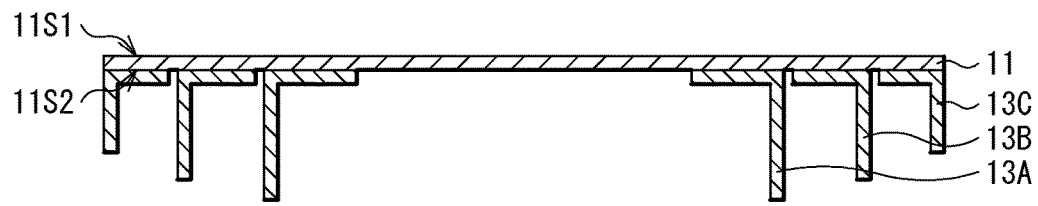
FIG. 4A is a cross-sectional schematic view of an example of a process of manufacturing the phosphor wheel illustrated in FIG. 1.
Figure 4B:
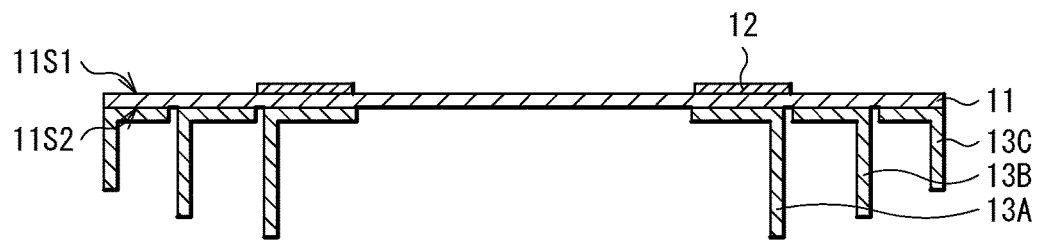
FIG. 4B is a cross-sectional schematic view of a process following FIG. 4A.

The phosphor wheel 10A according to the present embodiment is manufacturable, for example, as follows. FIG. 4A and FIG. 4B are each a schematic view of a process of manufacturing the phosphor wheel 10A illustrated in FIG. 1.

First, as illustrated in FIG. 4A, the heat dissipation members 13A, 13B, and 13C are bonded to the back surface (the surface 11S2) of the wheel substrate 11. Thereafter, as illustrated in FIG. 4B, the phosphor layer 12 is bonded to the front surface (the surface 11S1) of the wheel substrate 11.

Figure 5:
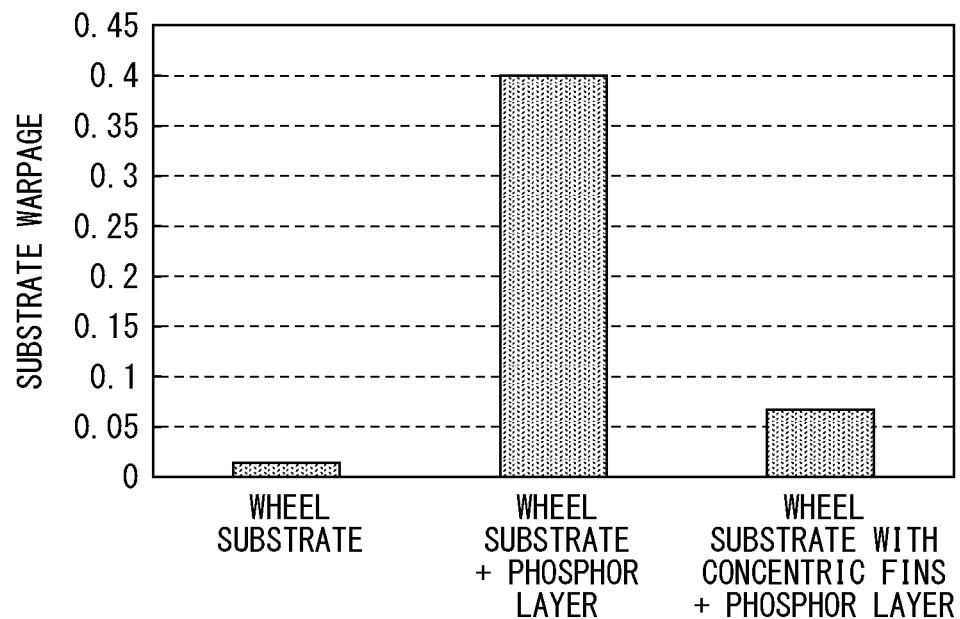
FIG. 5 is a characteristic diagram wheel substrate illustrating warpage.

FIG. 5 illustrates warpage of the wheel substrate 11. Here, an aluminum substrate having a diameter of 95 mm and a thickness of 0.8 mm is used as the wheel substrate 11 and a sintered phosphor is used as the phosphor layer 12. In a case where the phosphor layer 12 was fixed to the aluminum wheel substrate 11 using a thermosetting adhesive, the warpage of the wheel substrate 11 after thermal curing was 0.4. In contrast, as in the present embodiment, in a case where the plurality of concentric heat dissipation members 13 was fixed to the back surface (the surface 11S2) of the wheel substrate 11 following which the phosphor layer 12 was fixed to the front surface (the surface 11S1) of the wheel substrate 11, the warpage of the wheel substrate 11 after thermal curing was about 0.07. As described above, the bonding of the phosphor layer 12 after the bonding of the heat dissipation member 13 to the back surface of the wheel substrate 11 makes it possible to reduce the warpage to about ⅙ of the warpage of the wheel substrate 11.

1-3. Configuration of Light Source Apparatus

Figure 6:
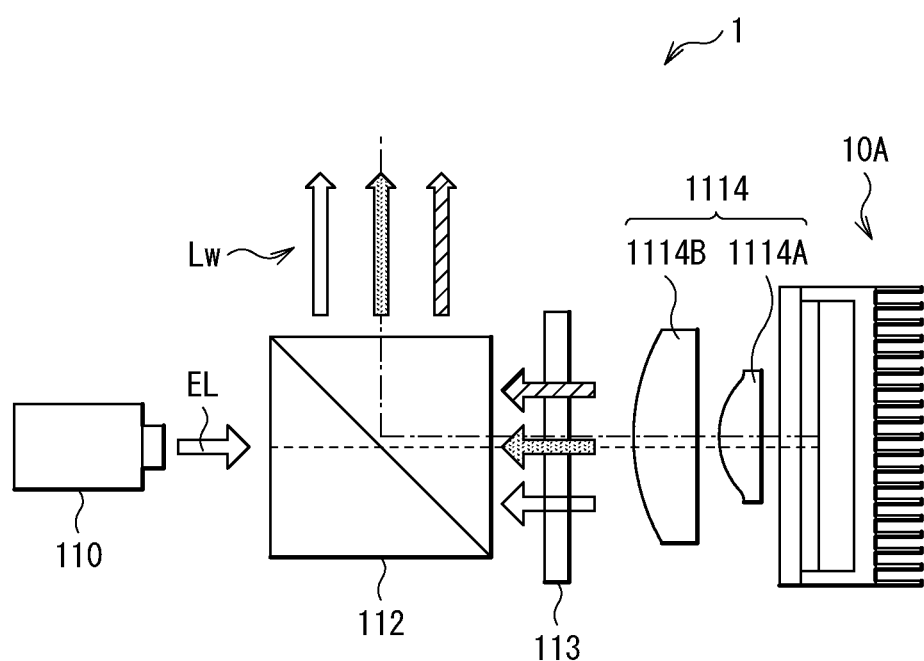
FIG. 6 is a schematic view of an example of an entire configuration of a light source apparatus including the phosphor wheel illustrated in FIG. 1.

FIG. 6 is a schematic view of an entire configuration of the light source apparatus 1. It is to be noted that, in FIG. 6, the phosphor wheel 10A is illustrated in a simplified manner together with the housing 20. The light source apparatus 1 includes: the phosphor wheel 10A as a wavelength converter; a light source unit 1110; a polarization beam splitter PBS 1112; a quarter-wave plate 1113; and a light-condensing optical system 1114 (1114A and 1114B). The members included in the light source apparatus 1 are disposed on an optical path of white light (multiplexed light Lw) outputted from the phosphor wheel 10A in the order of the light-condensing optical system 1114, the quarter-wave plate 1113, the PBS 1112, and the light source unit 1110, from the side of the phosphor wheel 10A.

The light source unit 1110 includes a solid-state light-emitting device that outputs light having a predetermined wavelength. In the present embodiment, as the solid-state light-emitting device, a semiconductor laser device that oscillates the excitation light EL (e.g., blue laser light having a wavelength of 445 nm or 455 nm) is used, and the excitation light EL of linearly polarized light (e.g., S-polarized light) is outputted from the light source unit 1110.

It is to be noted that, in a case where the light source unit 1110 includes the semiconductor laser device, the excitation light EL of a predetermined output may be obtained by one semiconductor laser device, or the excitation light EL of the predetermined output may be obtained by multiplexing the light outputted from a plurality of semiconductor laser devices. Further, a wavelength of the excitation light EL is not limited to the numerical values described above, and it is possible to use any wavelength as long as the wavelength is within the wavelength band of light that is referred to as blue light.

The PBS 1112 separates the excitation light EL entering from the light source unit 1110 and the multiplexed light Lw entering from the phosphor wheel 10A. Specifically, the PBS 1112 transmits the excitation light EL entering from the light source unit 1110 toward the quarter-wave plate 1113. Further, the PBS 1112 reflects the multiplexed light Lw entering from the phosphor wheel 10A and transmitted through the light-condensing optical system 1114 and the quarter-wave plate 1113. The reflected multiplexed light Lw enters an illumination optical system 2 (to be described later).

The quarter-wave plate 1113 is a phase difference device that causes a phase difference of $\pi/2$ with respect to incident light. In a case where the incident light is linearly polarized light, the quarter-wave plate 1113 converts the linearly polarized light into circularly polarized light, and in a case where the incident light is the circularly polarized light, the quarter-wave plate 1113 converts the circularly polarized light into the linearly polarized light. In the present embodiment, the excitation light EL that is the linearly polarized light outputted from the PBS 1112 is converted into the excitation light EL that is the circularly polarized light by the quarter-wave plate 1113. Further, an excitation light component of the circularly polarized light included in the multiplexed light Lw outputted from the phosphor wheel 10A is converted into the linearly polarized light by the quarter-wave plate 1113.

The light-condensing optical system 1114 (1114A and 1114B) condenses the excitation light EL outputted from the quarter-wave plate 1113 to have a predetermined spot diameter, and outputs the condensed excitation light EL toward the phosphor wheel 10A. Further, the light-condensing optical system 1114 converts the multiplexed light Lw outputted from the phosphor wheel 10A into parallel light, and outputs the parallel light toward the quarter-wave plate 1113. It is to be noted that the light-condensing optical system 1114, for example, may include a single collimating lens, may be configured to convert the incident light into the parallel light using a plurality of lenses.

A configuration of an optical member that separates the excitation light EL entering from the light source unit 1110 and the multiplexed light Lw outputted from the phosphor wheel 10A is not limited to the PBS 1112, and it is possible to use any optical member as long as the optical member has a configuration that enables the above-described light separating operation.

1-4. Workings and Effects

The light source apparatus 1 according to the present embodiment includes the phosphor wheel 10A in which, on the back surface (the surface 11S2) of the wheel substrate 11 provided with the phosphor layer 12, the three heat dissipation members 13A, 13B, and 13C each having the heat dissipation performance different from each other are concentrically disposed depending on the distances from the phosphor layer 12. The heat dissipation performance of each of the heat dissipation members 13A, 13B, and 13C is as follows: the heat dissipation member 13A>the heat dissipation member 13B>the heat dissipation member 13C. The heat dissipation member 13A having the highest heat dissipation performance is disposed nearest to (e.g., immediately below) the phosphor layer 12, the heat dissipation member 13B is disposed next, and the heat dissipation member 13C having the lowest heat dissipation performance is disposed at a position furthest from the phosphor layer 12 (e.g., on the peripheral edge portion of the wheel substrate 11). This makes it possible to efficiently diffuse the heat generation of the phosphor layer 12 caused by application of the excitation light EL while suppressing an increase in the weight of the phosphor wheel 10A. This will be described below.

In recent years, a laser light source having a small size, a long life, and a fast rise and fall has been widely used as a white light source. Although a semiconductor laser is mainly used as the laser, the semiconductor laser has low light emission efficiencies of GB light sources out of RGB light sources that are necessary for the white light source. For this reason, widely used is a light source apparatus (a phosphor laser light source) of a laser-phosphor system that generates the white light by synthesizing blue laser light and yellow fluorescence extracted by exciting the phosphor with the blue laser light.

However, there is an issue of temperature quenching that the light emission efficiency of the phosphor decreases as temperature rises. Accordingly, having been adopted is a method of suppressing the temperature rise of the phosphor by using a rotary phosphor wheel and diffusing heat generated by laser excitation. Such a light source apparatus may be lowered in the light emission efficiency or may be damaged due to the attachment of dust to the phosphor wheel. Thus, in an actual product, the phosphor wheel is disposed in a sealed space. As a heat dissipation technique of the phosphor wheel disposed in the sealed space, as described above, there is a method of providing concentric fins that are nested with each other on the back surface of the wheel substrate and on the surface of the sealed housing that is opposed to the back surface of the wheel substrate, and improving cooling efficiency of the light emission unit of the phosphor by utilizing the Taylor vortex generated between the fins when the wheel substrate is rotationally driven.

However, in the light source apparatus having the above-described heat dissipation structure, balancing between the heat dissipation efficiency and the weight of the phosphor wheel is cited as an issue. It is possible to improve the heat dissipation efficiency of the above-described light source apparatus by increasing the number of fins and increasing lengths of the fins, but in this case, the weight increases, resulting in issues of an increase in a size and an increase in a cost of a drive motor.

In contrast, the light source apparatus 1 according to the present embodiment includes, for example, three heat dissipation members 13A, 13B, and 13C each having heat dissipation performance different from each other depending on the distance from the phosphor layer 12 are provided on the back surface (the surface 11S2) of the wheel substrate 11 on which the phosphor layer 12 is provided. Specifically, the heat dissipation member (the heat dissipation member 13A) having higher heat dissipation performance is disposed as the distance from the phosphor layer 12 decreases, and the heat dissipation member (the heat dissipation member 13C) having lower heat dissipation performance is disposed as the distance from the phosphor layer 12 increases. This makes it possible to efficiently lower the temperature of the phosphor layer 12 increased by application of the excitation light EL while suppressing the increase in the weight of the phosphor wheel 10A.

As described above, in the present embodiment, on the back surface (the surface 11S2) of the wheel substrate 11 on which the phosphor layer 12 is provided, the heat dissipation member (the heat dissipation member 13A) having higher heat dissipation performance is disposed as the distance from the phosphor layer 12 decreases, and the heat dissipation member (the heat dissipation member 13C) having lower heat dissipation performance is disposed as the distance from the phosphor layer 12 increases. This makes it possible to efficiently cool the phosphor layer 12 that has generated heat by application of the excitation light EL while suppressing the increase in the weight of the phosphor wheel 10A. That is, it is possible to improve the heat dissipation efficiency.

Further, in the present embodiment, the three heat dissipation members 13A, 13B, and 13C are concentrically disposed on the back surface (the surface 11S2) of the wheel substrate 11, for example. Thus, it becomes possible to reduce the warpage of the wheel substrate 11 when fixing the phosphor layer 12 to the front surface (the surface 11S1). This suppresses deflection of a phosphor surface, and allows stable power to be outputted as a light source. That is, it leads to restraint of flicker. It is also possible to suppress noise.

Next, description is given of second and third embodiments and modification examples 1 to 8 of the present disclosure, and application examples. In the following, components similar to those of the foregoing first embodiment are denoted by same reference numerals, and description thereof is omitted where appropriate.

2. Second Embodiment

Figure 7:
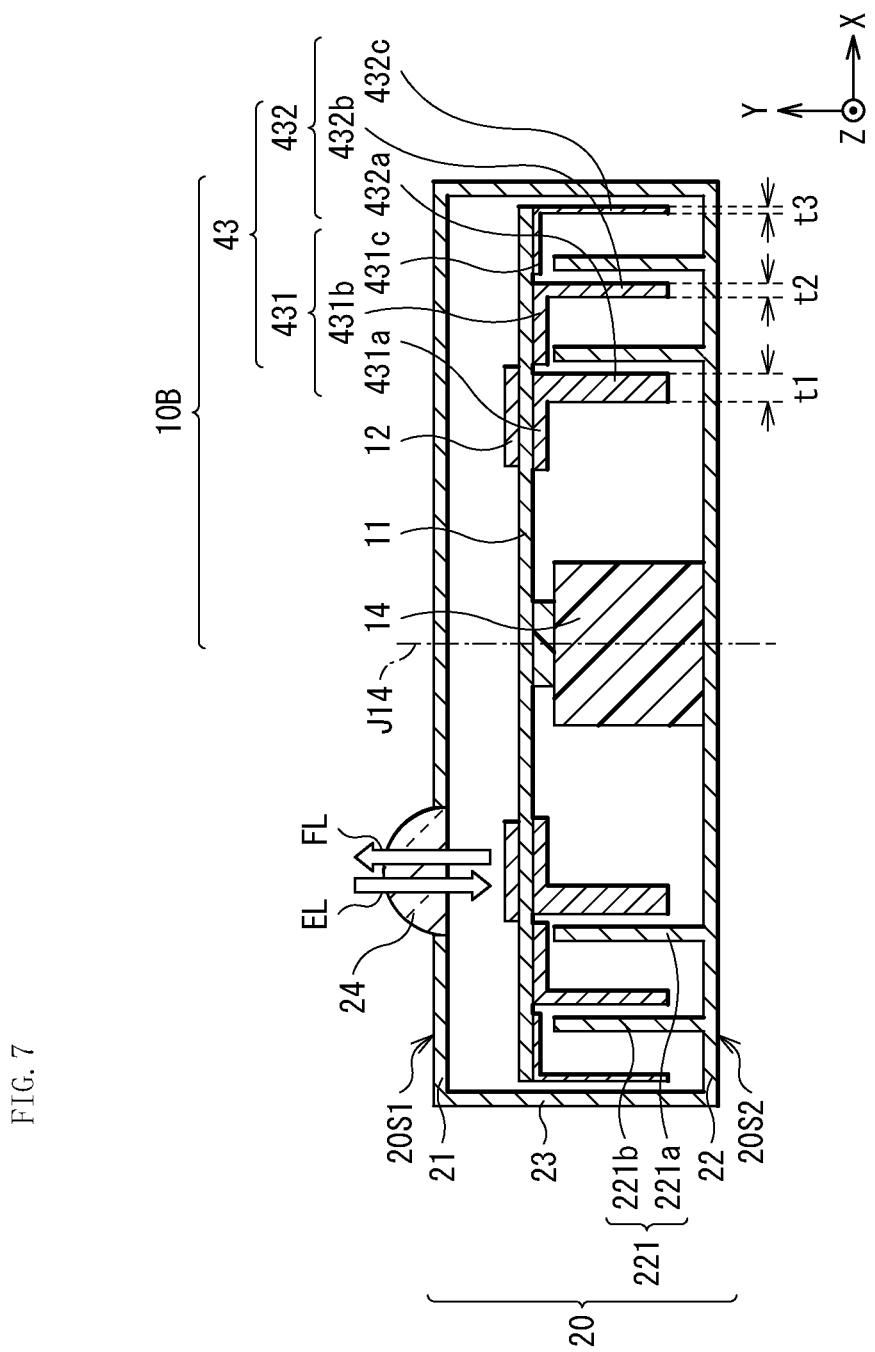
FIG. 7 is a cross-sectional schematic view of configurations of a phosphor wheel and a housing included in a light source apparatus according to a second embodiment of the present disclosure.

FIG. 7 schematically illustrates cross-sectional configurations of a wavelength converter (a phosphor wheel 10B) and a housing 20 included in a light source apparatus (the light source apparatus 1) according to a second embodiment of the present disclosure. As with the phosphor wheel 10A according to the foregoing first embodiment, the phosphor wheel 10B is used as, for example, a light-emitting device (a wavelength converter) included in a light source apparatus (e.g., the light source apparatus 1) of a projection display apparatus (the projector 1000) to be described later. The phosphor wheel 10B according to the present embodiment is different from the foregoing first embodiment in that three heat dissipation members 43A, 43B, and 43C respectively having fins 432a, 432b, and 432c whose thicknesses are different from each other are used as heat dissipation members 43 each having heat dissipation performance different from each other.

In the phosphor wheel 10B, the three concentric heat dissipation members 43A, 43B, and 43C are disposed, as the plurality of heat dissipation members 43, on the back surface (surface 11S2) side of the wheel substrate 11, as with the phosphor wheel 10A. The heat dissipation members 43A, 43B, and 43C include, as with the heat dissipation members 13A, 13B, and 13C, stationary portions 431 (431a, 431b, and 431c) bonded to the back surface (the surface 11S2) of the wheel substrate 11 and fins 432 (432a, 432b, and 432c) bent substantially parallel to the rotation axis J14 of the phosphor wheel 10B.

Among the heat dissipation members 43A, 43B, and 43C, the heat dissipation member 43A has the highest heat dissipation performance, the heat dissipation member 43B has the next highest heat dissipation performance, and the heat dissipation member 43C has the lowest heat dissipation performance. In the present embodiment, as with the foregoing first embodiment, the heat dissipation member 43A having the highest heat dissipation performance is disposed nearest to the phosphor layer 12 that is to be a heat source, e.g., immediately below the phosphor layer 12, and the heat dissipation member 43C having the lowest heat dissipation performance is disposed furthest from the phosphor layer 12, e.g., on the peripheral edge portion of the wheel substrate 11. That is, the heat dissipation members 43A, 43B, and 43C are disposed in this order from the center (O) of rotation of the wheel substrate 11.

In the present embodiment, the heat dissipation performance of each of the heat dissipation members 43A, 43B, and 43C is adjusted by the respective thicknesses of the fins 432a, 432b and 432c, as described above. Specifically, the heat dissipation members 43A, 43B, and 43C have the fin 432a having a thickness t1, the fin 432b having a thickness t2, and the fin 432c having a thickness t3, respectively, and a relationship of the thicknesses t1>t2>t3 is satisfied. Thus, the thickness of the fin 432a of the heat dissipation member 43A disposed closest to the phosphor layer 12 is made the thickest and the thicknesses of the fins 432b and 432c are made thinner as the distance from the phosphor layer 12 increases. This makes it possible to reduce the weight of the phosphor wheel 10A while maintaining the cooling efficiency of the heat generator (the phosphor layer 12) by the heat dissipation members 43A, 43B, and 43C.

As described above, in the present embodiment, the three heat dissipation members 43A, 43B, and 43C having the fins 432a, 432b, and 432c whose thicknesses are different from each other are disposed in such a manner that the heat dissipation member 43A having the highest heat dissipation performance is disposed nearest to (e.g., immediately below) the phosphor layer 12, and the heat dissipation member 43C having the lowest heat dissipation performance is disposed at a position furthest from the phosphor layer 12 (e.g., on the peripheral edge portion of the wheel substrate 11). This makes it possible to obtain similar effects as those of the foregoing first embodiment.

3. Third Embodiment

Figure 8:
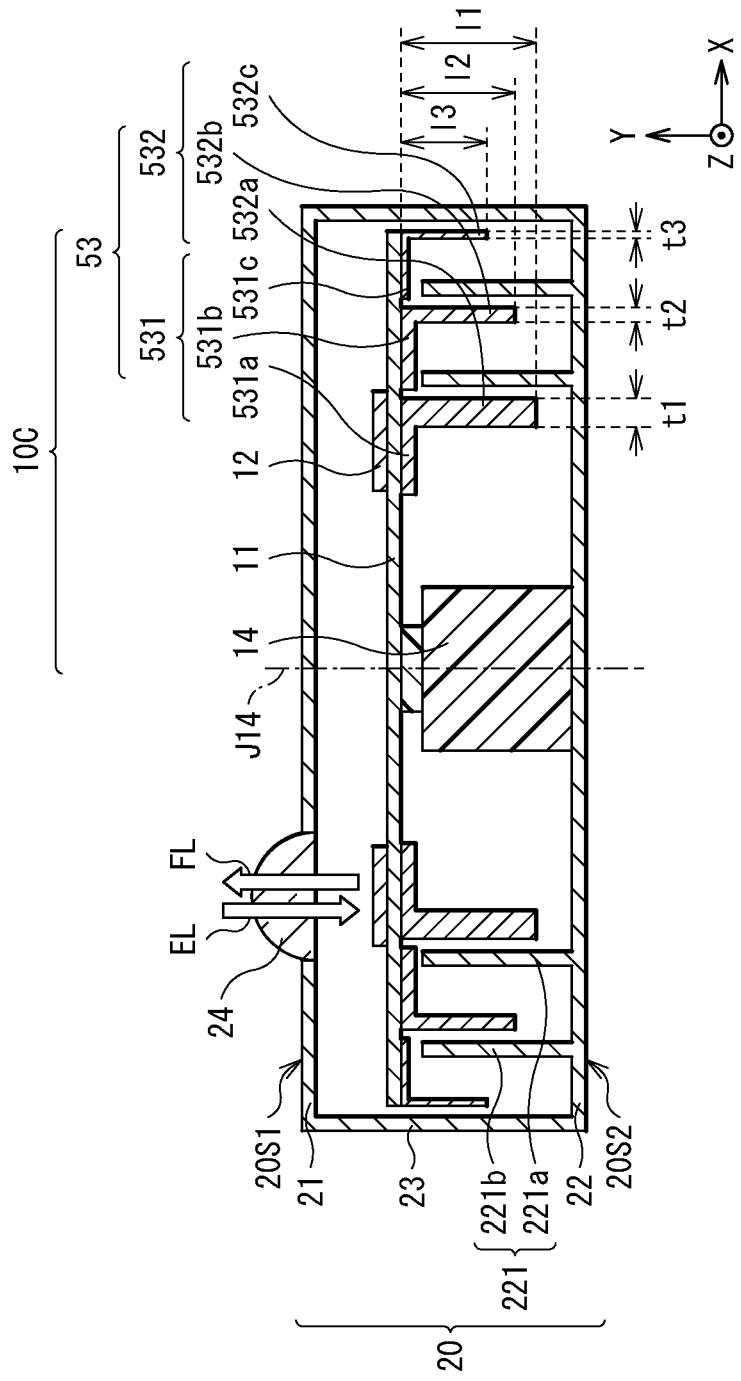
FIG. 8 is a cross-sectional schematic view of configurations of a phosphor wheel and a housing included in a light source apparatus according to a third embodiment of the present disclosure.

FIG. 8 schematically illustrates cross-sectional configurations of a wavelength converter (a phosphor wheel 10C) and the housing 20 included in a light source apparatus (the light source apparatus 1) according to the third embodiment of the present disclosure. As with the phosphor wheel 10A according to the foregoing first embodiment, the phosphor wheel 10C is used as, for example, a light-emitting device (a wavelength converter) included in a light source apparatus (e.g., the light source apparatus 1) of a projection display apparatus (the projector 1000) to be described later. The phosphor wheel 10C according to the present embodiment is different from the foregoing first embodiment in that three heat dissipation members 53A, 53B, and 53C respectively having fins 532a, 532b, and 532c whose lengths and thicknesses are different from each other are used as heat dissipation members 53 each having heat dissipation performance different from each other.

In the phosphor wheel 10C, the three concentric heat dissipation members 53A, 53B, and 53C are disposed, as the plurality of heat dissipation members 53, on the back surface (surface 11S2) side of the wheel substrate 11, as with the phosphor wheel 10A. The heat dissipation members 53A, 53B, and 53C include stationary portions 531 (531a, 531b, and 531c) bonded to the back surface (the surface 11S2) of the wheel substrate 11 and fins 532 (532a, 532b, and 532c) bent substantially parallel to the rotation axis J14 of the phosphor wheel 10C.

Among the heat dissipation members 53A, 53B, and 53C, the heat dissipation member 53A has the highest heat dissipation performance, the heat dissipation member 53B has the next highest heat dissipation performance, and the heat dissipation member 53C has the lowest heat dissipation performance. In the present embodiment, as with the foregoing first embodiment, the heat dissipation member 53A having the highest heat dissipation performance is disposed nearest to the phosphor layer 12 that is to be a heat source, e.g., immediately below the phosphor layer 12, and the heat dissipation member 53C having the lowest heat dissipation performance is disposed furthest from the phosphor layer 12, e.g., on the peripheral edge portion of the wheel substrate 11. That is, the heat dissipation members 53A, 53B, and 53C are disposed in this order from the center (O) of rotation of the wheel substrate 11.

In the present embodiment, the heat dissipation performance of each of the heat dissipation members 53A, 53B, and 53C is adjusted by the respective lengths and the respective thicknesses of the fins 532a, 532b, and 532c, as described above. Specifically, the heat dissipation members 53A, 53B, and 53C have the fin 532a having a length l1 and a thickness t1, the fin 532b having a length l2 and a thickness t2, and the fin 532c having a length l3 and a thickness t3, respectively, and a relationship of the lengths l1>l2>l3 and a relationship of the thicknesses t1>t2>t3 are satisfied. Thus, the length of the fin 532a of the heat dissipation member 53A disposed closest to the phosphor layer 12 is made longer and the thickness of the fin 532a is made the thickest, and the lengths of the fins 532b and 532c are made shorter and the thicknesses of the fins 532b and 532c are made thinner as the distance from the phosphor layer 12 increases. This makes it possible to reduce the weight of the phosphor wheel 10A while maintaining the cooling efficiency of the heat generator (the phosphor layer 12) by the heat dissipation members 53A, 53B, and 53C.

As described above, in the present embodiment, the three heat dissipation members 53A, 53B, and 53C having the fins 532a, 532b, and 532c whose lengths and thicknesses are different from each other are disposed in such a manner that the heat dissipation member 53A having the highest heat dissipation performance is disposed nearest to (e.g., immediately below) the phosphor layer 12, and the heat dissipation member 53C having the lowest heat dissipation performance is disposed at a position furthest from the phosphor layer 12 (e.g., on the peripheral edge portion of the wheel substrate 11). This makes it possible to improve the heat dissipation efficiency as compared with similar effects as those of the foregoing first embodiment.

For example, in a case where a phosphor wheel in which four concentric circle fins having uniform cross-sectional shapes are disposed on the wheel substrate 11 having a diameter of 95 mm and a thickness of 0.8 mm and a phosphor wheel in which four fins having different lengths and different thicknesses are disposed on the wheel substrate 11 as with the present embodiment, and where the wheel weights are the same, the latter phosphor wheel is expected to have a peak-temperature reduction effect of about 5%. In addition, if the phosphor wheels have the same cooling efficiency, it is possible to reduce the weight of the latter phosphor wheel, and to extend the life of the motor 14 of the latter phosphor wheel, for example.

4. MODIFICATION EXAMPLE

4-1. Modification Example 1

Figure 9:
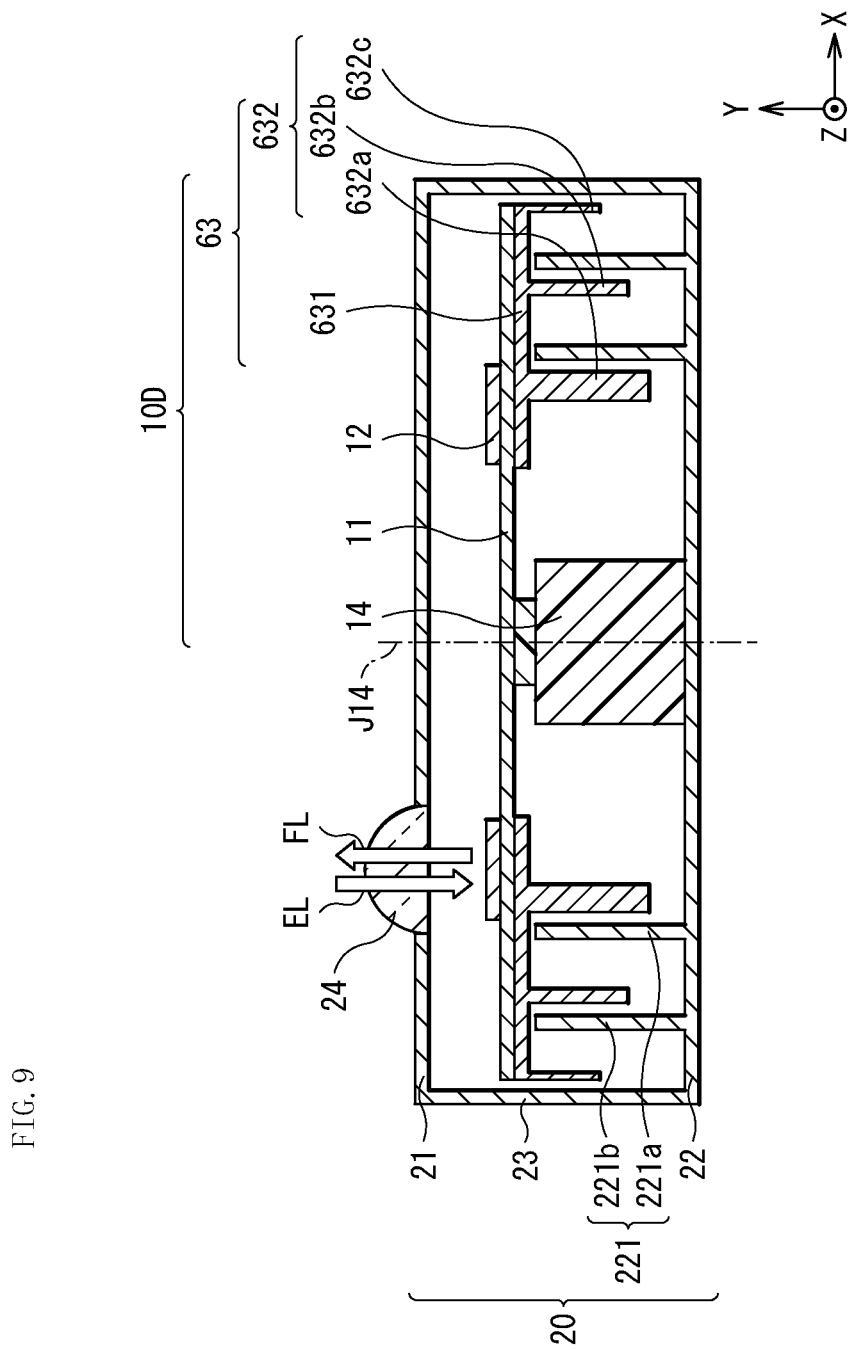
FIG. 9 is a cross-sectional schematic view of configurations of a phosphor wheel and a housing included in a light source apparatus according to a modification example 1 of the present disclosure.

FIG. 9 schematically illustrates cross-sectional configurations of a wavelength converter (a phosphor wheel 10D) and the housing 20 included in a light source apparatus (the light source apparatus 1) according to a modification example 1 of the present disclosure. As with the phosphor wheel 10A according to the foregoing first embodiment, the phosphor wheel 10D is used as, for example, a light-emitting device (a wavelength converter) included in a light source apparatus (e.g., the light source apparatus 1) of a projection display apparatus (the projector 1000) to be described later. The phosphor wheel 10D according to the present modification example differs from the foregoing third embodiment and the like in that a plurality of fins 632 disposed on the back surface (the surface 11S2) of the wheel substrate 11 is integrally formed.

In the phosphor wheel 10D, three concentric fins 632a, 632b and 632c having different lengths and different thicknesses, as with the phosphor wheel 10C according to the foregoing third embodiment, are integrally formed as a plurality of heat dissipation members 63 on the back surface (surface 11S2) side of the wheel substrate 11. In the present modification example, the fins 632a, 632b, and 632c are formed in a common stationary portion (a stationary portion 631) that is bonded to the back surface (the surface 11S2) of the wheel substrate 11.

Such a plurality of heat dissipation members 63 formed in an integrated manner may be manufactured, for example, by cutting, casting, 3D printing, or the like.

As described above, in the present modification example, the fins 632a, 632b, and 632c included in the plurality of heat dissipation members 63 are integrally formed on the common stationary portion (the stationary portion 631). This increases a contact area between the wheel substrate 11 and the heat dissipation member 63, thereby reducing contact resistance. Accordingly, it is possible to further improve the heat dissipation efficiency as compared with the foregoing third embodiment.

4-2. Modification Example 2

Figure 10:
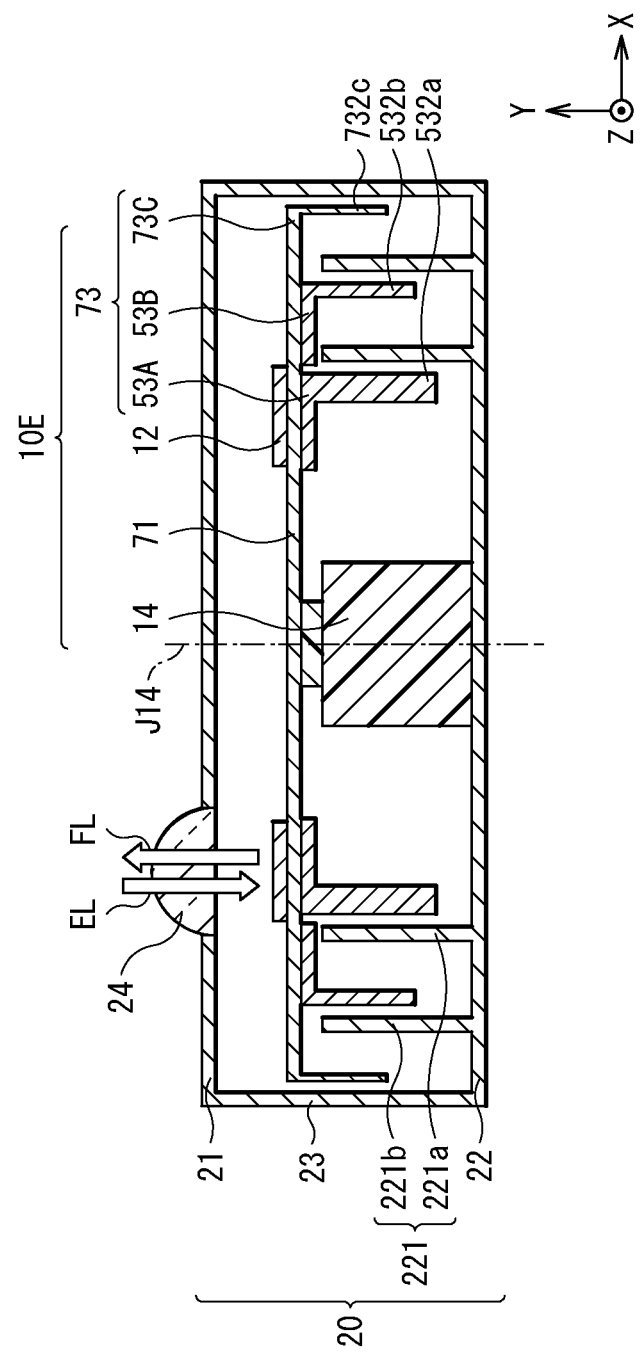
FIG. 10 is a cross-sectional schematic view of configurations of a phosphor wheel and a housing included in a light source apparatus according to a modification example 2 of the present disclosure.

FIG. 10 schematically illustrates cross-sectional configurations of a wavelength converter (a phosphor wheel 10E) and the housing 20 included in a light source apparatus (the light source apparatus 1) according to a modification example 2 of the present disclosure. As with the phosphor wheel 10A according to the foregoing first embodiment, the phosphor wheel 10E is used as, for example, a light-emitting device (a wavelength converter) included in a light source apparatus (e.g., the light source apparatus 1) of a projection display apparatus (the projector 1000) to be described later. The phosphor wheel 10E according to the present modification example differs from the foregoing third embodiment in that, among a plurality of heat dissipation members 73 disposed on a back surface (a surface 71S2) of a wheel substrate 71, a heat dissipation member 73C, which is disposed on a peripheral edge portion the wheel substrate 71, is integrally formed with the wheel substrate 71.

The phosphor wheel 10E is provided with three concentric heat dissipation members 53A, 53B, and 73C having different lengths and different thicknesses, as with the phosphor wheel 10C according to the foregoing third embodiment, as the plurality of heat dissipation members 73 on the back surface (surface 71S2) side of the wheel substrate 11. In the present modification example, among the three heat dissipation members 53A, 53B, and 73C, a fin 732c of the heat dissipation member 73C disposed on the outermost circumference is formed integrally with the wheel substrate 71 by bending a peripheral edge portion of the wheel substrate 71 to the back surface (the surface 71S2).

As described above, in the present modification example, the heat dissipation member 73C disposed on the outermost circumference, among the plurality of heat dissipation members 73, is formed integrally with the wheel substrate 71. This eliminates contact resistance between the outermost heat dissipation member 73C and the wheel substrate 71. Accordingly, it is possible to further improve the heat dissipation efficiency as compared with the foregoing third embodiment.

4-3. Modification Example 3

Figure 11:
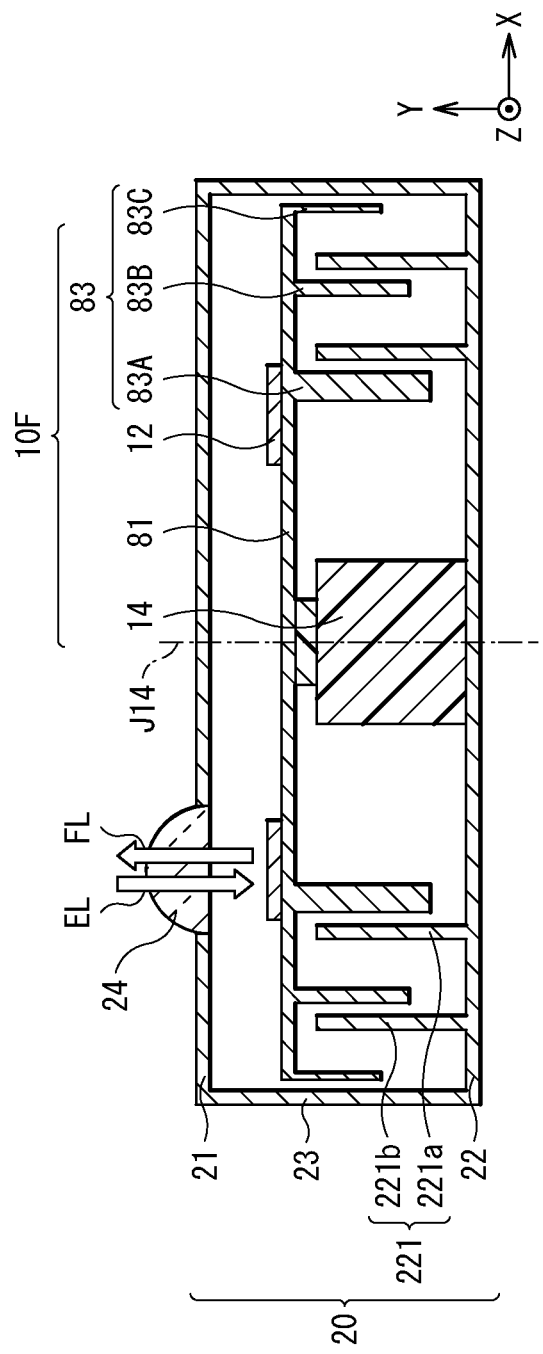
FIG. 11 is a cross-sectional schematic view of configurations of a phosphor wheel and a housing included in a light source apparatus according to a modification example 3 of the present disclosure.

FIG. 11 schematically illustrates cross-sectional configurations of a wavelength converter (a phosphor wheel 10F) and the housing 20 included in a light source apparatus (the light source apparatus 1) according to a modification example 3 of the present disclosure. As with the phosphor wheel 10A according to the foregoing first embodiment, the phosphor wheel 10F is used as, for example, a light-emitting device (a wavelength converter) included in a light source apparatus (e.g., the light source apparatus 1) of a projection display apparatus (the projector 1000) to be described later. The phosphor wheel 10F according to the present modification example differs from the foregoing third embodiment in that a plurality of heat dissipation members 83 disposed on a back surface (a surface 81S2) of a wheel substrate 81 is formed integrally with the wheel substrate 81.

The phosphor wheel 10F is provided with three concentric heat dissipation members 83A, 83B, and 83C having different lengths and different thicknesses, as with the phosphor wheel 10C of the foregoing third embodiment, as the plurality of heat dissipation members 83 on the back surface (surface 81S2) side of the wheel substrate 11. In the present modification example, the three heat dissipation members 83A, 83B, and 83C are integrally formed with the wheel substrate 81.

Such a plurality of heat dissipation members 83 formed in an integrated manner may be manufactured, for example, by cutting, casting, 3D printing, or the like.

As described above, in the present modification example, the plurality of heat dissipation members 83 disposed on the back surface (the surface 81S2) of the wheel substrate 81 is formed integrally with the wheel substrate 81. This eliminates contact resistance between the outermost heat dissipation member 83C and the wheel substrate 81. Accordingly, it is possible to further improve the heat dissipation efficiency as compared with the foregoing modification example 2.

In the present modification example, it is preferable that the phosphor layer 12 be fixed to the wheel substrate 81 via the reflection film 15 as illustrated in FIG. 3. As a result, surface roughness and reflectance demanded for the surface, of the wheel substrate 81 integrally formed with plurality of heat dissipation members 83 manufactured by cutting or 3D printing, in contact with the phosphor layer 12 are reduced. Thus, it is possible to reduce cost.

4-4. Modification Example 4

Figure 12:
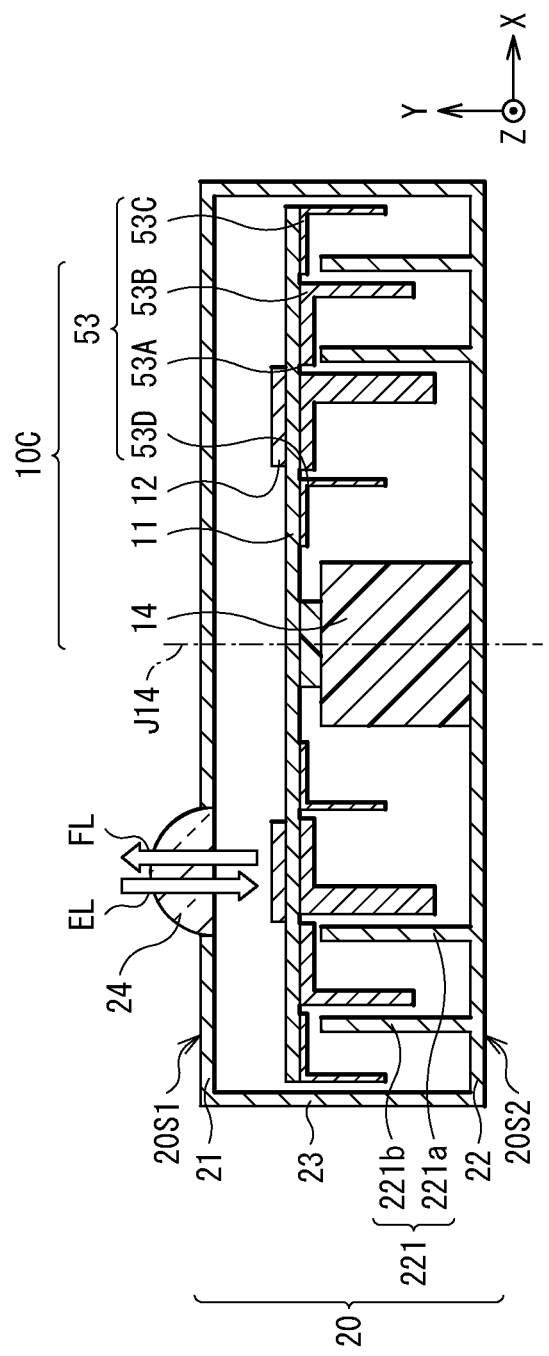
FIG. 12 is a cross-sectional schematic view of configurations of a phosphor wheel and a housing included in a light source apparatus according to a modification example 4 of the present disclosure.

FIG. 12 schematically illustrates cross-sectional configurations of a wavelength converter (a phosphor wheel 10C) and the housing 20 included in a light source apparatus (the light source apparatus 1) according to a modification example 4 of the present disclosure. As with the phosphor wheel 10A according to the foregoing first embodiment, the phosphor wheel 10C is used as, for example, a light-emitting device (a wavelength converter) included in a light source apparatus (e.g., the light source apparatus 1) of a projection display apparatus (the projector 1000) to be described later. The phosphor wheel 10C according to the present modification example is a modification example of the foregoing third embodiment, in which a heat dissipation member (e.g., a heat dissipation member 53D) is further disposed on an inner periphery of the phosphor layer 12 as a plurality of heat dissipation members 53 disposed on the back surface (the surface 11S2) of the wheel substrate 11. Further, the housing 20 is further provided with a fin 221d in combination with the heat dissipation member 53D.

As described above, the heat dissipation member 53D is further disposed on the inner periphery of the phosphor layer 12. This makes it possible to further improve the heat dissipation efficiency without increasing a size of an outer shape of the phosphor wheel 10C.

4-5. Modification Example 5

Figure 13:
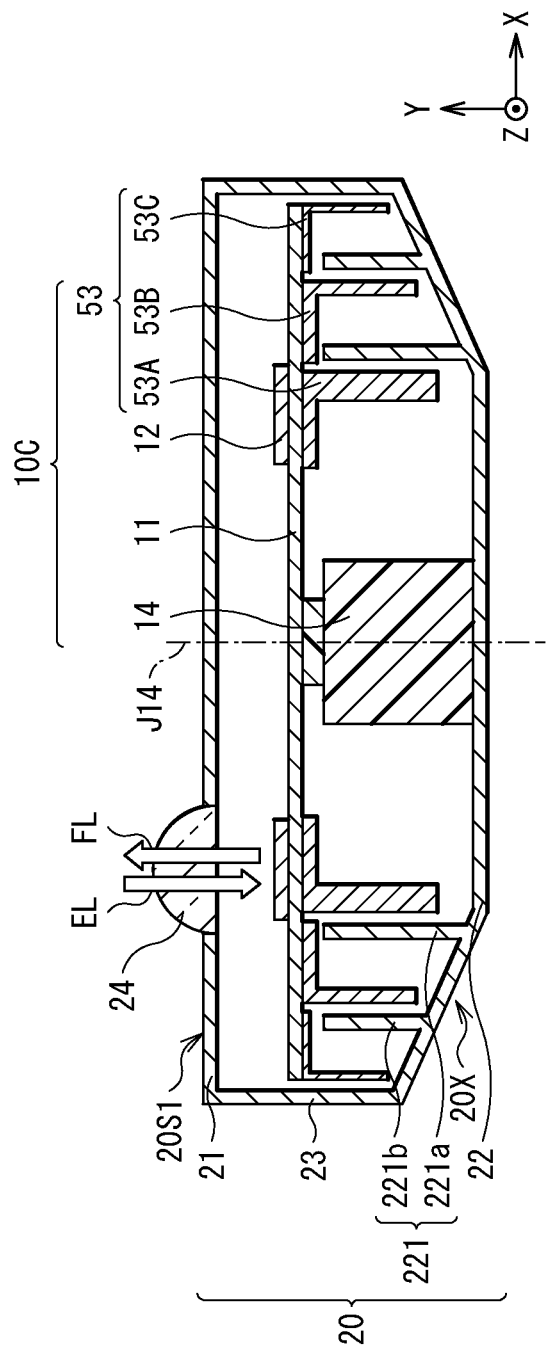
FIG. 13 is a cross-sectional schematic view of an example of configurations of a phosphor wheel and a housing included in a light source apparatus according to a modification example 5 of the present disclosure.

FIG. 13 schematically illustrates cross-sectional configurations of a wavelength converter (a phosphor wheel 10C) and the housing 20 included in a light source apparatus (the light source apparatus 1) according to a modification example 5 of the present disclosure. As with the phosphor wheel 10A according to the foregoing first embodiment, the phosphor wheel 10C is used as, for example, a light-emitting device (a wavelength converter) included in a light source apparatus (e.g., the light source apparatus 1) of a projection display apparatus (the projector 1000) to be described later. The phosphor wheel 10C according to the present modification example is a modification example of the foregoing third embodiment, in which a sloping surface 20X is formed on the peripheral edge portion of the back face side of the housing 20 in accordance with shape change of the plurality of heat dissipation members 53A, 53B, and 53C provided on the wheel substrate 11.

As described above, the sloping surface 20X is provided to the peripheral edge portion of the back face side of the housing 20 in accordance with the shape change of the heat dissipation members 53A, 53B, and 53C, for example, the lengths of the fins 532a, 532b, and 532c. This shortens a discharge path, to the outside air, of the heat that has been transferred from the heat dissipation members 53A and 53B to the fins 221a and 221b, and makes it possible to reduce thermal resistance. Accordingly, it is possible to further improve the heat dissipation efficiency as compared with the foregoing third embodiment. Further, it is also possible to miniaturize the housing 20 that contains the phosphor wheel 10C.

Figure 14:
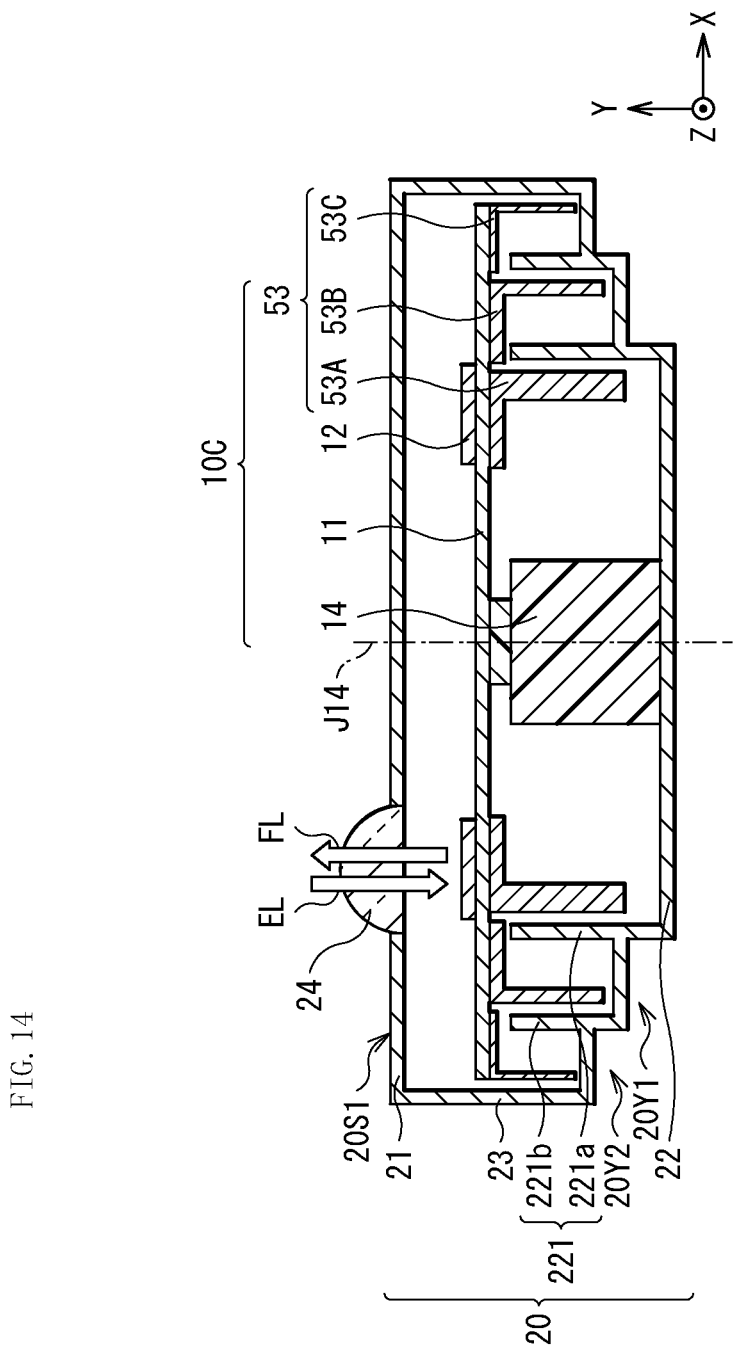
FIG. 14 is a cross-sectional schematic view of another example of the configurations of the phosphor wheel and the housing included in the light source apparatus according to the modification example 5 of the present disclosure.

It is to be noted that, although FIG. 13 illustrates an example in which the sloping surface 20X is provided on the peripheral edge portion of the back face side of the housing 20, the shape of the housing 20 is not limited thereto. For example, as illustrated in FIG. 14, steps 20Y1 and 20Y2 may be provided on the peripheral edge portion of the back face side of the housing 20 in accordance with shape change of the heat dissipation members 53A, 53B, and 53C.

4-6. Modification Example 6

Figure 15:
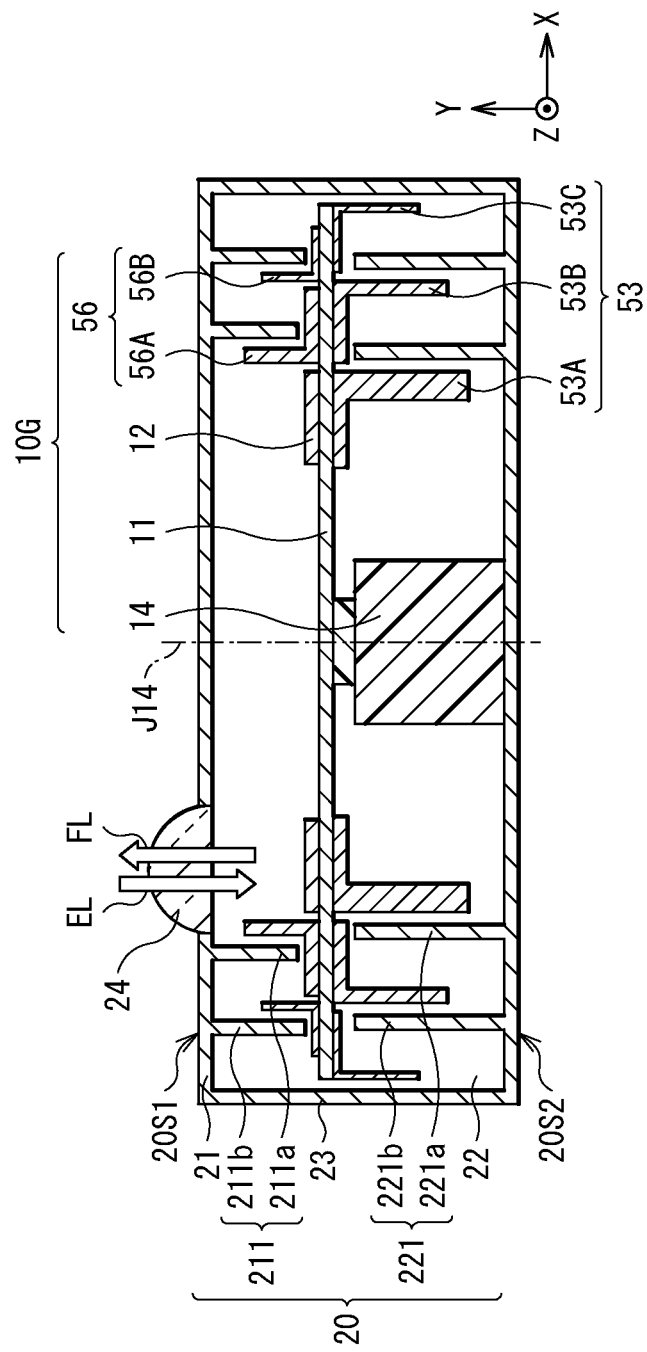
FIG. 15 is a cross-sectional schematic view of an example of configurations of a phosphor wheel and a housing included in a light source apparatus according to a modification example 6 of the present disclosure.

FIG. 15 schematically illustrates cross-sectional configurations of a wavelength converter (a phosphor wheel 10G) and the housing 20 included in a light source apparatus (the light source apparatus 1) according to a modification example 6 of the present disclosure. As with the phosphor wheel 10A according to the foregoing first embodiment, the phosphor wheel 10G is used as, for example, a light-emitting device (a wavelength converter) included in a light source apparatus (e.g., the light source apparatus 1) of a projection display apparatus (the projector 1000) to be described later. In the phosphor wheel 10G according to the present modification example, a plurality of heat dissipation members 56 is further disposed on an outer periphery of the phosphor layer 12 on the front surface (the surface 11S1) of the wheel substrate 11.

In the phosphor wheel 10G, in addition to the back surface (surface 11S2) side of the wheel substrate 11, the front surface (surface 11S1) side is also provided with the plurality of concentric heat dissipation members 56 each having heat dissipation performance different from each other and centered on the center (O) of rotation of the wheel substrate 11. In the present modification example, two concentric heat dissipation members 56A and 56B having different lengths and different thicknesses, for example, are disposed, as with the phosphor wheel 10C according to the foregoing third embodiment, as the plurality of heat dissipation members 56. Regarding the two heat dissipation members 56A and 56B, the heat dissipation member 56A has heat dissipation performance higher than that of the heat dissipation member 56B, and a distance from the heat dissipation member 56A to the phosphor layer 12 is shorter than a distance from the heat dissipation member 56B to the phosphor layer 12. The heat dissipation member 56B has heat dissipation performance lower than that of the heat dissipation member 56A, and is disposed, for example, on the peripheral edge portion of the wheel substrate 11. The two heat dissipation members 56A and 56B each correspond to a specific example of a "third heat dissipation member" of the present disclosure.

Further, in the present modification example, two concentric fins 211 (211a and 211b), for example, centered on the center (O) of rotation of the wheel substrate 11, for example, are provided on the front face portion 21 of the housing 20, and are disposed in a nested manner with the heat dissipation members 56A and 56B provided on the front surface (the surface 11S1) of the wheel substrate 11. That is, the front face portion 21 of the housing 20 corresponds to a specific example of a "second supporting member" of the present disclosure, and the two fins 211 (211a and 211b) each correspond to a specific example of a "fourth heat dissipation member" of the present disclosure.

As described above, in the present modification example, the two concentric heat dissipation members 56A and 56B each having heat dissipation performance different from each other are provided on the front surface (the surface 11S 1) of the wheel substrate 11, and further, the two fins 211a and 211b are provided in a nested manner with the two heat dissipation members 56A and 56B on the front face portion 21 of the housing 20. As a result, when the phosphor wheel 10G is rotationally driven, the Taylor vortex is generated in the fluid between the heat dissipation member 56A and the fin 211a and between the heat dissipation member 56B and the fin 211b, thereby making it possible to efficiently transfer the heat generated by the phosphor layer 12 also from the front surface (surface 11S 1) side of the wheel substrate 11 to the housing 20. Accordingly, it is possible to further improve the heat dissipation efficiency as compared with the foregoing third embodiment.

Figure 16:
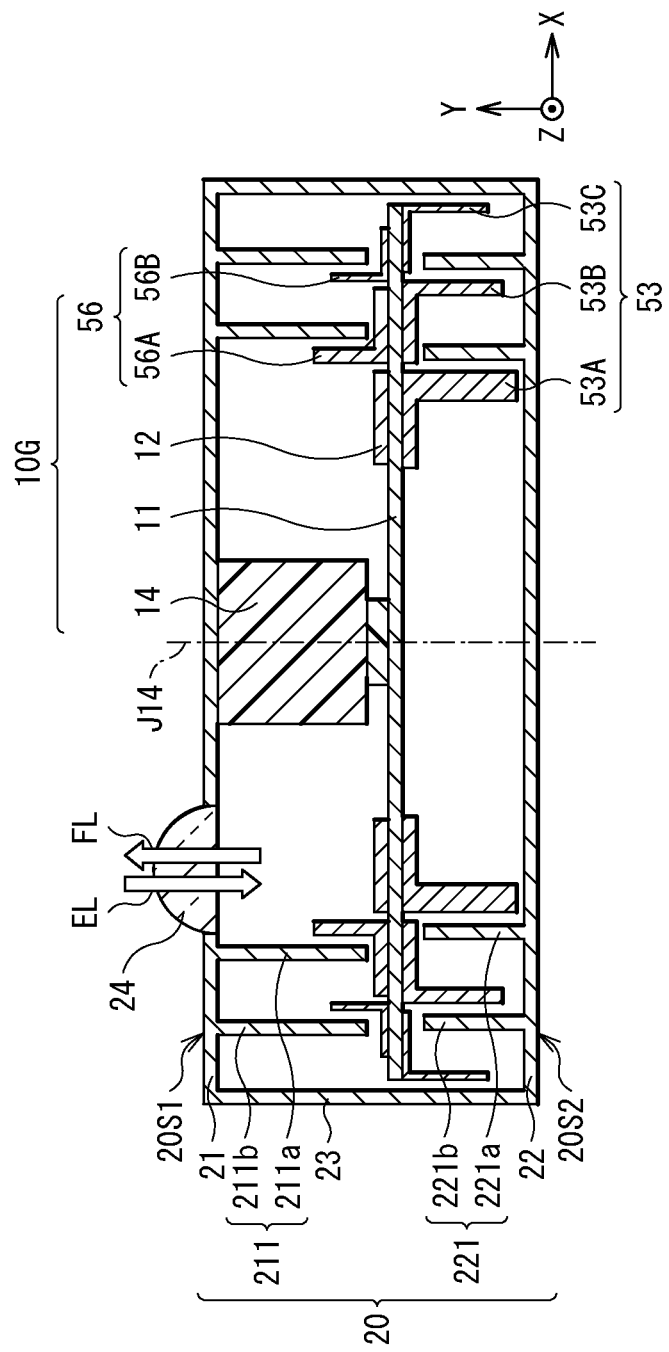
FIG. 16 is a cross-sectional schematic view of another example of the configurations of the phosphor wheel and the housing included in the light source apparatus according to the modification example 6 of the present disclosure.

It is to be noted that, although FIG. 15 illustrates an example in which the motor 14 is disposed on the back surface (surface 11S2) side of the wheel substrate 11, the motor 14 may be disposed on the front surface (surface 11S1) side of the wheel substrate 11, for example, as illustrated in FIG. 16. This makes it possible to shorten the lengths of the fins 221a and 221b formed on the back face portion 22, and to shorten the discharge path, to the outside air, of the heat that has been transferred from the heat dissipation members 53A and 53B to the fins 221a and 221b. Accordingly, as with the foregoing modification example 5, it is possible to reduce the thermal resistance, and to further improve the heat dissipation efficiency. This similarly applies to the first to third embodiments, the modification examples 1 to 5, and a modification example 7 to be described next.

4-7. Modification Example 7

Figure 17:
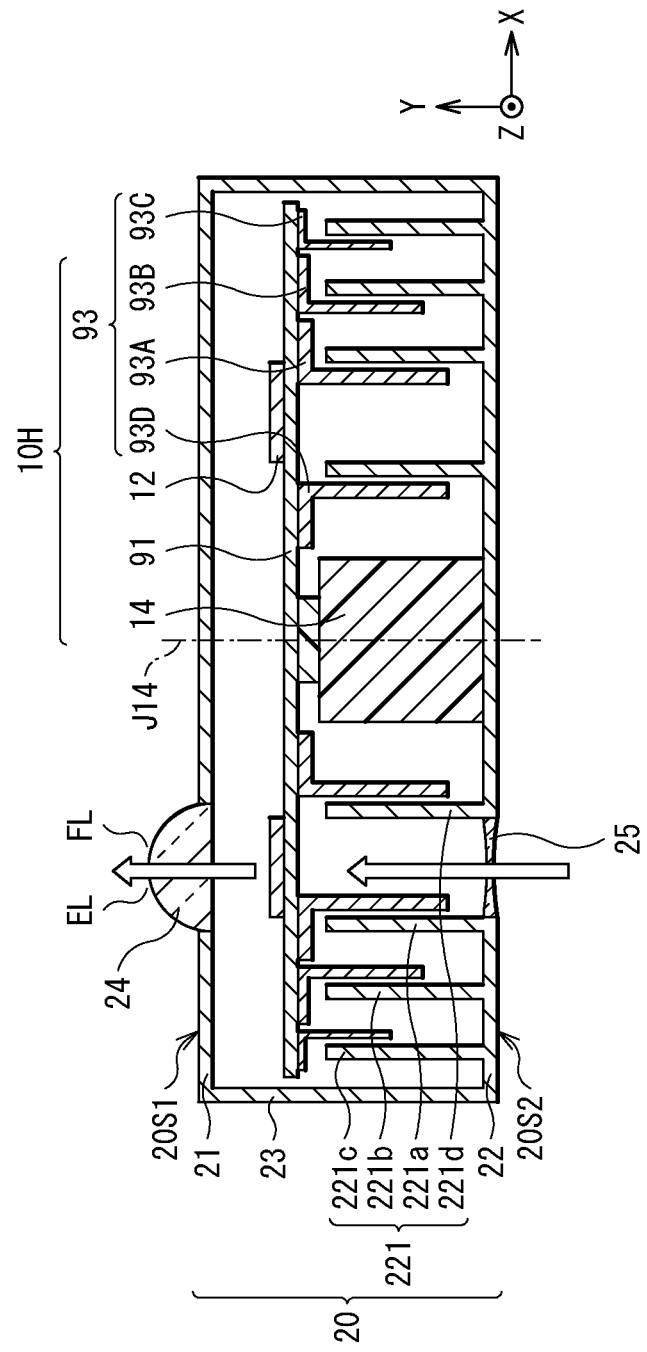
FIG. 17 is a cross-sectional schematic view of configurations of a phosphor wheel and a housing included in a light source apparatus according to a modification example 7 of the present disclosure.

FIG. 17 schematically illustrates cross-sectional configurations of a wavelength converter (a phosphor wheel 10H) and the housing 20 included in a light source apparatus (the light source apparatus 1) according to a modification example 7 of the present disclosure. As with the phosphor wheel 10A according to the foregoing first embodiment, the phosphor wheel 10H is used as, for example, a light-emitting device (a wavelength converter) included in a light source apparatus (e.g., the light source apparatus 1) of a projection display apparatus (the projector 1000) to be described later. The phosphor wheel 10H according to the present modification example is a so-called transmissive wavelength converter in which the fluorescence FL converted in the phosphor layer 12 is outputted from a side opposite to the excitation light EL-entering direction.

The phosphor wheel 10H is provided with four concentric heat dissipation members 93A, 93B, 93C, and 93D having different lengths and different thicknesses, as with the phosphor wheel 10C of the foregoing third embodiment, as a plurality of heat dissipation members 93 on the back surface (surface 91S2) side of the wheel substrate 11.

The four heat dissipation members 93A, 93B, 93C, and 93D are disposed in such a manner that, as with the modification example 4, the heat dissipation members 93A, 93B, and 93C are disposed on the outer periphery of the phosphor layer 12, and the heat dissipation member 93D is disposed on the inner periphery of the phosphor layer 12. Of the four heat dissipation members 93A, 93B, 93C, and 93D, the heat dissipation members 93A and 93D each have high heat dissipation performance as compared to the other two heat dissipation members 93B and 93C, and have the same heat dissipation performance as each other. The two heat dissipation members 93A and 93D are disposed, for example, in such a manner that stationary portions 931a and 931b extend in opposite directions so as not to obstruct the application of the excitation light EL entering from the back face (surface S2) side of the housing 20 to the phosphor layer 12.

In addition, a lens 25 is disposed at a position, in the back face portion 22 included in the housing 20, at which the excitation light EL enters (a position directly opposite to the phosphor layer 12). The lens 25 may be, for example, a concave lens that controls an extent to which the excitation light EL is applied to the phosphor layer 12.

As described above, it is possible to apply the present technology to the transmissive wavelength converter (the phosphor wheel 10H). Along with the similar effects as those of the foregoing third embodiment, it becomes possible to suppress an increase in a weight of the phosphor wheel 10H and to efficiently cool the phosphor layer 12 which is heated by the application of the excitation light EL, thereby making it possible to improve the heat dissipation efficiency.

It is to be noted that, although FIG. 17 illustrates an example in which the excitation light EL enters through the back face (surface S2) side of the housing 20 and the fluorescence FL is outputted through the front face (surface S1) side of the housing 20, the example is not limited thereto, and the excitation light EL may enter through the front face (surface S1) side of the housing 20 and the fluorescence FL may be outputted through the back face (surface S2) side of the housing 20.

4-8. Modification Example 8

Figure 18:
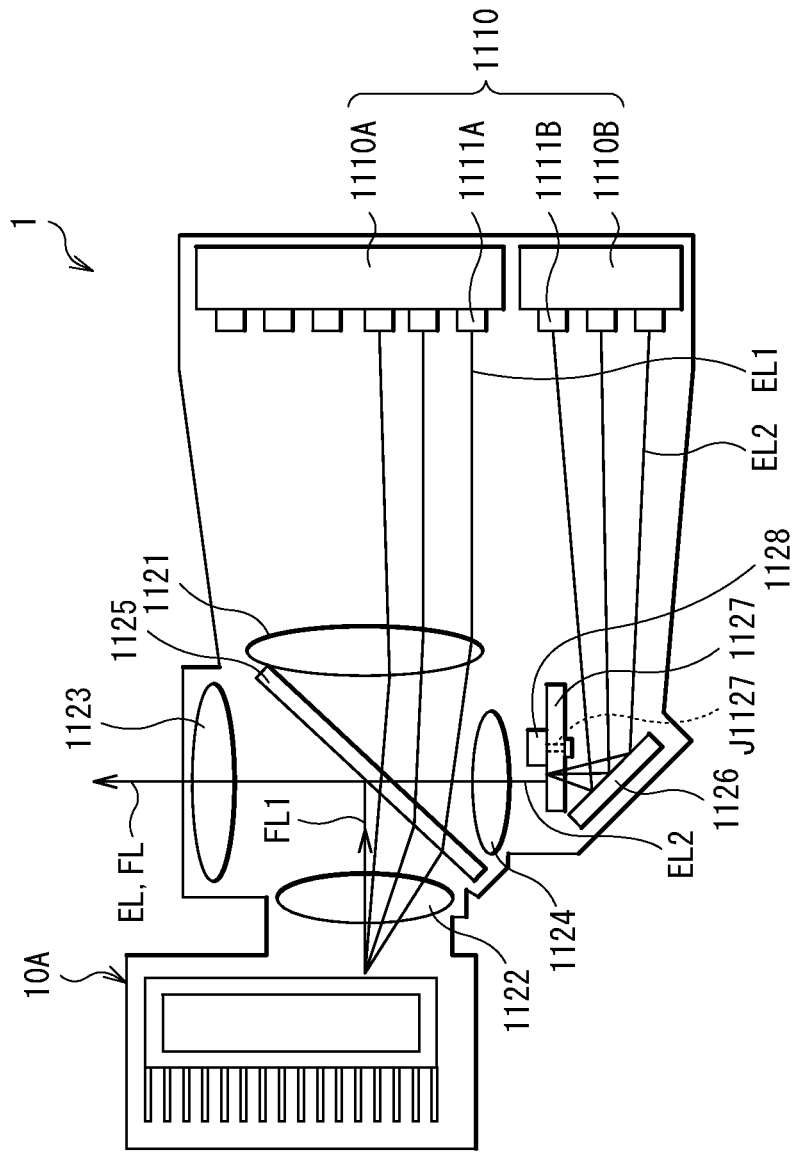
FIG. 18 is a schematic view of another example of the entire configuration of the light source apparatus including the phosphor wheel illustrated in FIG. 1.

FIG. 18 is a schematic view of another configuration example of the light source apparatus 1 illustrated in the foregoing first embodiment. The light source apparatus 1 may have, for example, the following configuration.

The light source apparatus 1 includes the phosphor wheel 10A, a diffuser 1127, a light source unit 1110 that emits excitation light or laser light, lenses 1121 to 1124, a dichroic mirror 1125, and a reflective mirror 1126. The diffuser 1127 is coupled to a motor 1128, and is rotatable about an axis J1127. The light source unit 1110 includes a first laser group 1110A and a second laser group 1110B. The first laser group 1110A includes a plurality of semiconductor laser devices 1111A that oscillates excitation light (for example, a wavelength of 445 nm or 455 nm), and the second laser group 1110B includes a plurality of semiconductor laser devices 1111B that oscillates blue laser light (for example, a wavelength of 465 nm). Herein, for the sake of convenience, the excitation light oscillated by the first laser group 1110A is denoted by EL1, and the blue laser light (hereinafter simply referred to as blue light) oscillated by the second laser group 1110B is denoted by EL2.

In the light source apparatus 1, the phosphor wheel 10A is disposed to cause the excitation light EL1 having passed through the lens 1121, the dichroic mirror 1125, and the lens 1122 from the first laser group 1110A to enter the phosphor layer 12. The fluorescence FL outputted from the phosphor wheel 10A is reflected by the dichroic mirror 1125, thereafter passes through the lens 1123, and is directed toward outside, for example, toward the illumination optical system 2 to be described later. The diffuser 1127 diffuses the blue light (the laser light EL2) from the second laser group 1110B through the reflective mirror 1126. The blue light (the laser light EL2) diffused by the diffuser 1127 passes through the lens 1124 and the dichroic mirror 1125, and thereafter, passes through the lens 1123 and is directed toward outside, that is, toward the illumination optical system 2.

It is to be noted that a cooling fan is desirably provided in the light source apparatus 1 in order to cool heat generated in the phosphor layer 12 in association with application of the excitation light EL1 and the laser light EL2. Moreover, a layout of respective members included in the light source apparatus 1 is not limited to the configuration illustrated in FIG. 18.

5. APPLICATION EXAMPLE

Figure 19:
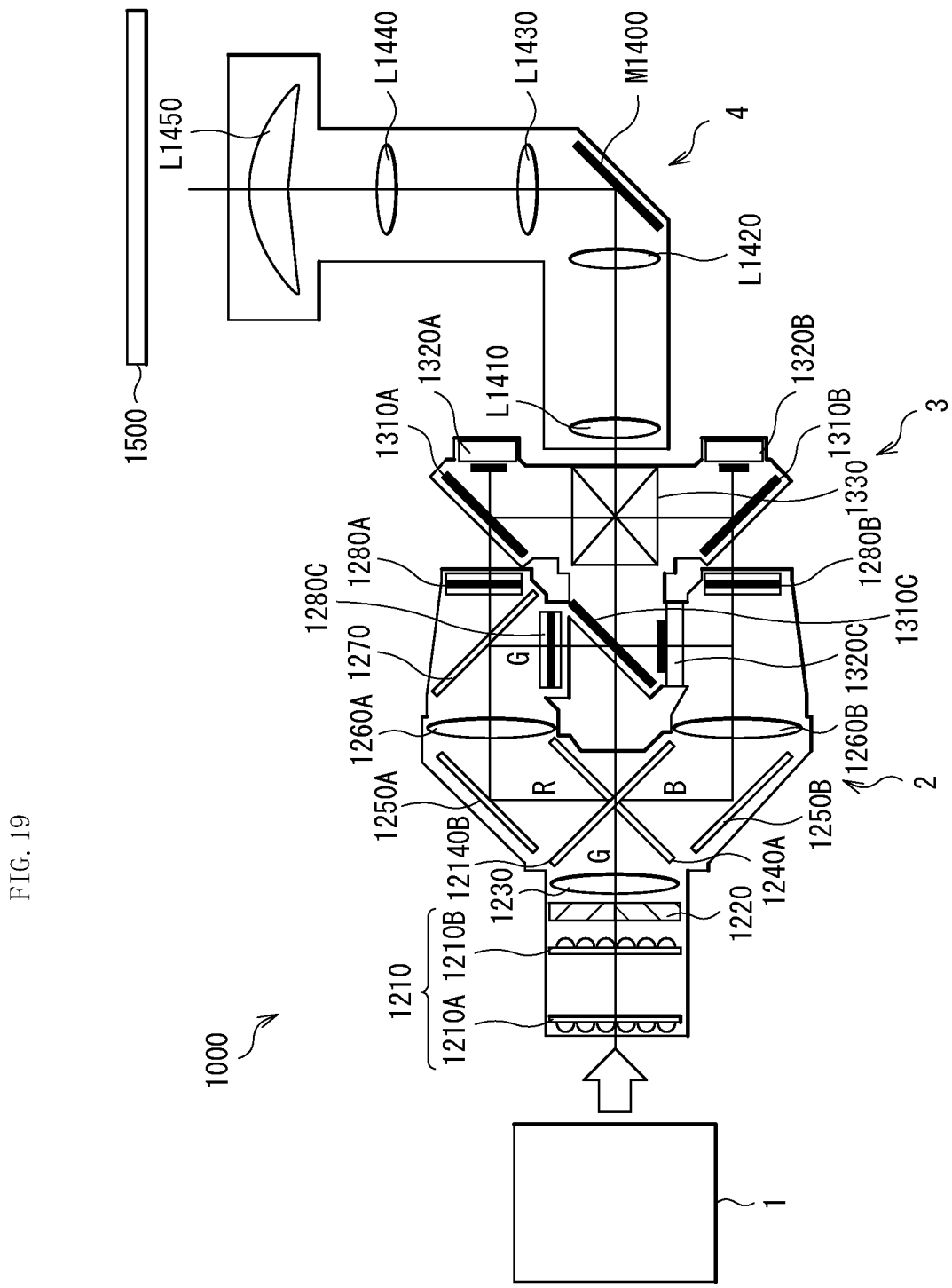
FIG. 19 is a schematic view of an example of a configuration example of a projection display apparatus including the light source apparatus illustrated in FIG. 6.
Figure 20:
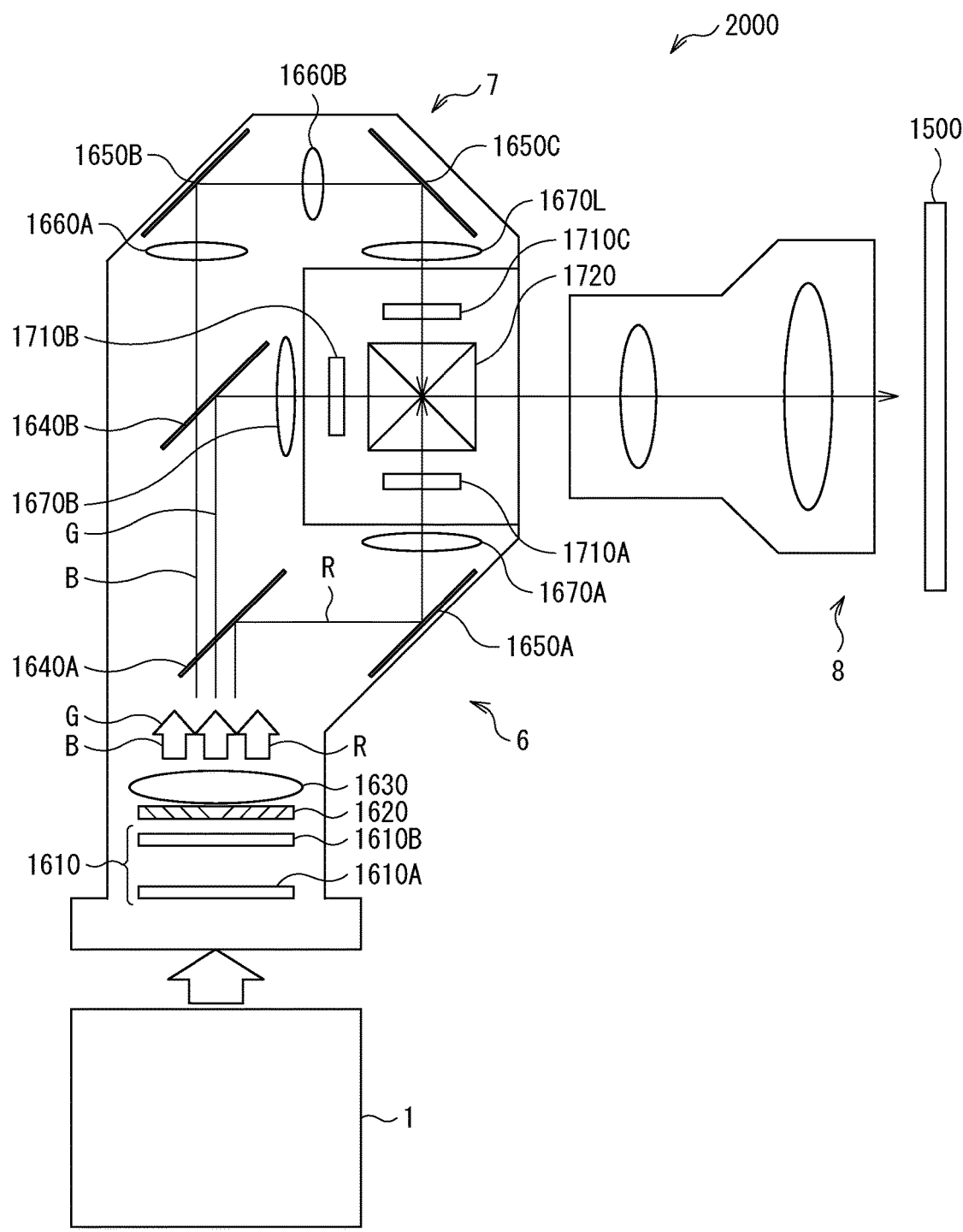
FIG. 20 is a schematic view of another example of the configuration example of the projection display apparatus including the light source apparatus illustrated in FIG. 6.

Next, description is given of projection display apparatuses (projectors 1000 and 2000) including the light source apparatus 1 that includes the phosphor wheel 10A (or any of the phosphor wheels 10B, 10C, 10D, 10E, 10F, 10G, and 10H) with reference to FIGS. 19 and 20. FIG. 19 exemplifies a reflective 3LCD projector (the projector 1000) that performs light modulation by a reflective liquid crystal panel (LCD). FIG. 20 exemplifies a reflective 3LCD projector (a projector 2000) that performs light modulation by a transmissive liquid crystal panel (LCD). It is to be noted that the projection display apparatus according to the present disclosure is also applicable to, for example, a projector using a digital micro-mirror device (DMD), etc., in place of the reflective liquid crystal panel and the transmissive liquid crystal panel.

Application Example 1

FIG. 19 illustrates an example of a configuration of the reflective 3LCD projector 1000 that performs light modulation by the reflective liquid crystal panel (LCD). The projector 1000 includes, for example, the light source apparatus 1 described in the foregoing first embodiment, an illumination optical system 2, an image-forming unit 3, and a projection optical system 4 in order. It is to be noted that the illumination optical system 2 and the image-forming unit 3 correspond to a specific example of an image generation optical system of the present disclosure.

The illumination optical system 2 includes, for example, fly-eye lenses 1210 (1210A and 1210B), a polarization conversion device 1220, a lens 1230, dichroic mirrors 1240A and 1240B, reflective mirrors 1250A and 1250B, lenses 1260A and 1260B, a dichroic mirror 1270, and polarizing plates 1280A to 1280C from a position close to the light source apparatus 1.

The fly-eye lenses 1210 (1210A and 1210B) homogenize an illuminance distribution of white light from the lens 65 of the light source apparatus 1. The polarization conversion device 1220 functions to orient a polarization axis of incident light to a predetermined direction. For example, the polarization conversion device 1220 converts light other than P-polarized light into P-polarized light. The lens 1230 condenses light from the polarization conversion device 1220 toward the dichroic mirrors 1240A and 1240B. The dichroic mirrors 1240A and 1240B selectively reflect light in a predetermined wavelength range, and selectively allow light in a wavelength range other than the predetermined wavelength range to pass therethrough. For example, the dichroic mirror 1240A reflects mainly red light to a direction of the reflective mirror 1250A. Moreover, the dichroic mirror 1240B reflects mainly blue light to a direction of the reflective mirror 1250B. Accordingly, green light passes through both the dichroic mirrors 1240A and 1240B to be directed to a reflective polarizing plate 1310C (to be described later) of the image-forming unit 3. The reflective mirror 1250A reflects light (mainly red light) from the dichroic mirror 1240A toward the lens 1260A, and the reflective mirror 1250B reflects light (mainly blue light) from the dichroic mirror 1240B toward the lens 1260B. The lens 1260A allows light (mainly red light) from the reflective mirror 1250A to pass therethrough, and condenses the light to the dichroic mirror 1270. The lens 1260B allows light (mainly blue light) from the reflective mirror 1250B to pass therethrough, and condenses the light to the dichroic mirror 1270. The dichroic mirror 1270 selectively reflects green light, and selectively allows light in a wavelength range other than the green light to pass therethrough. Herein, the dichroic mirror 1270 allows a red light component of light from the lens 1260A to pass therethrough. In a case where a green light component is included in the light from the lens 1260A, the dichroic mirror 1270 reflects the green light component toward the polarizing plate 1280C. The polarizing plates 1280A to 1280C include a polarizer having a predetermined polarization axis. For example, in a case where conversion into P-polarized light is performed in the polarization conversion device 1220, the polarizing plates 1280A to 1280C allow P-polarized light to pass therethrough, and reflect S-polarized light.

The image-forming unit 3 includes reflective polarizing plates 1310A to 1310C, reflective liquid crystal panels 1320A to 1320C, and a dichroic prism 1330.

The reflective polarizing plates 1310A to 1310C respectively allow light having the same polarization axis (for example, P-polarized light) as the polarization axis of polarized light from the polarizing plates 1280A to 1280C to pass therethrough, and reflect light (S-polarized light) having any other polarization axis. Specifically, the reflective polarizing plate 1310A allows P-polarized red light from the polarizing plate 1280A to be transmitted toward a direction of the reflective liquid crystal panel 1320A. The reflective polarizing plate 1310B allows P-polarized blue light from the polarizing plate 1280B to be transmitted toward a direction of the reflective liquid crystal panel 1320C. The reflective polarizing plate 1310C allows P-polarized green light from the polarizing plate 1280C to be transmitted toward a direction of the reflective liquid crystal panel 1320C. Moreover, P-polarized green light having passed through both the dichroic mirrors 1240A and 1240B to enter the reflective polarizing plate 1310C passes through the reflective polarizing plate 1310C as it is to enter the dichroic prism 1330. Moreover, the reflective polarizing plate 1310A reflects S-polarized red light from the reflective liquid crystal panel 1320A to cause the S-polarized red light to enter the dichroic prism 1330. The reflective polarizing plate 1310B reflects S-polarized blue light from the reflective liquid crystal panel 1320C to cause the S-polarized blue light to enter the dichroic prism 1330. The reflective polarizing plate 1310C reflects S-polarized green light from the reflective liquid crystal panel 1320C to cause the S-polarized green light to enter the dichroic prism 1330.

The reflective liquid crystal panels 1320A to 1320C respectively perform spatial modulation of red light, blue light, and green light.

The dichroic prism 1330 synthesizes incident red light, incident blue light, and incident green light, and outputs synthesized light toward the projection optical system 4.

The projection optical system 4 includes, for example, a plurality of lenses (lenses L1410 to L1450), and a mirror M1400. The projection optical system 4 enlarges light outputted from the image-forming unit 3 and projects the enlarged light on a screen 1500, etc.

(Operations of Light Source Apparatus and Projector)

Next, description is given of an operation of the projector 1000 including the light source apparatus 1 with reference to FIGS. 6 and 19.

First, the excitation light EL is oscillated from the light source unit 1110 toward the PBS 1112. The excitation light EL is reflected by the PBS 1112 and then transmitted through the quarter-wave plate 1113 and the light-condensing optical system 1114 in this order to be applied to the phosphor wheel 10A.

In the phosphor wheel 10A (e.g., a phosphor wheel 10AA), some of the excitation light EL (e.g., the blue light) is absorbed in the phosphor layer 12 and converted into light (the fluorescence FL; e.g., the yellow light) in a predetermined wavelength band. The fluorescence FL emitted in the phosphor layer 12 is diffused together with some of the excitation light EL not absorbed in the phosphor layer 12 and reflected to a side of the light-condensing optical system 1114. As a result, in the phosphor wheel 10A, the fluorescence FL and some of the excitation light EL are multiplexed to generate white light, and the white light (the multiplexed light Lw) is outputted toward the light-condensing optical system 1114.

Thereafter, the multiplexed light Lw is transmitted through the light-condensing optical system 1114, the quarter-wave plate 1113, and the PBS 1112, and enters the illumination optical system 2.

The multiplexed light Lw (the white light) from the light source apparatus 1 passes through the fly-eye lenses 1210 (1210A and 1210B), the polarization conversion device 1220, and the lens 1230 in order, and thereafter reaches the dichroic mirrors 1240A and 1240B.

Mainly red light R is reflected by the dichroic mirror 1240A, and the red light R passes through the reflective mirror 1250A, the lens 1260A, the dichroic mirror 1270, the polarizing plate 1280A, and the reflective polarizing plate 1310A in order to reach the reflective liquid crystal panel 1320A. The red light R is spatially modulated in the reflective liquid crystal panel 1320A, and thereafter is reflected by the reflective polarizing plate 1310A to enter the dichroic prism 1330. It is to be noted that in a case where light reflected to the reflective mirror 1250A by the dichroic mirror 1240A includes a green light component, the green light component is reflected by the dichroic mirror 1270, and passes through the polarizing plate 1280C and the reflective polarizing plate 1310C in order to reach the reflective liquid crystal panel 1320C. In the dichroic mirror 1240B, mainly blue light B is reflected, and enters the dichroic prism 1330 through a similar process. Green light G having passed through the dichroic mirrors 1240A and 1240B also enters the dichroic prism 1330.

The red light, the blue light, and the green light having entered the dichroic prism 1330 are synthesized into image light, and the image light is outputted to the projection optical system 4. The projection optical system 4 enlarges the image light from the image-forming unit 3, and projects the enlarged image light on the screen 1500, etc.

Application Example 2

FIG. 20 is a schematic view of an example of a configuration of the transmissive 3LCD projection display apparatus (the projector 2000) that performs light modulation by a transmissive liquid crystal panel (LCD). The projector 2000 includes, for example, the light source apparatus 1, an illumination optical system 6, an image-forming unit 7, and a projection optical system 8.

The illumination optical system 6 includes, for example, an integrator device 1610, a polarization conversion device 1620, and a converging lens 1630. The integrator device 1610 includes a first fly-eye lens 1610A and a second fly-eye lens 1610B. The first fly-eye lens 1610A includes a plurality of microlenses arranged two-dimensionally, and the second fly-eye lens 1610B includes a plurality of microlenses arranged to correspond one by one to the microlenses of the first fly-eye lens 1610A.

Light (parallel light) incident on the integrator device 1610 from the light source apparatus 1 is divided into a plurality of light fluxes by the microlenses of the first fly-eye lens 1610A, and an image of each of the light fluxes is formed on a corresponding one of the microlenses of the second fly-eye lens 1610B. Each of the microlenses of the second fly-eye lens 1610B serves as a secondary light source, and a plurality of parallel light beams having uniform luminance is applied as incident light to the polarization conversion device 1620.

The integrator device 1610 has a function of arranging incident light applied from the light source apparatus 1 to the polarization conversion device 1620 in a uniform luminance distribution as a whole.

The polarization conversion device 1620 has a function of aligning a polarization state of incident light incident thereon through the integrator device 1610, etc. The polarization conversion device 1620 outputs output light including the blue light B, the green light G, and the red light R through the lens, etc., disposed on an output side of the light source apparatus 1, for example.

The illumination optical system 6 further includes a dichroic mirror 1640A, a dichroic mirror 1640B, a mirror 1650A, a mirror 1650B, a mirror 1650C, a relay lens 1660A, a relay lens 1660B, a field lens 1670A, a field lens 1670B, a field lens 1670C, liquid crystal panels 1710A, 1710B, and 1710C as the image-forming unit 7, and a dichroic prism 1720.

The dichroic mirror 1640A and the dichroic mirror 1640B have properties of selectively reflecting color light in a predetermined wavelength range, and allowing light in a wavelength range other than the predetermined wavelength range to pass therethrough. For example, the dichroic mirror 1640A selectively reflects the red light R. The dichroic mirror 1640B selectively reflects the green light G of the green light G and the blue light B that have passed through the dichroic mirror 1640A. The remaining blue light B passes through the dichroic mirror 1640B. Thus, light (e.g., white multiplexed light Lw) emitted from the light source apparatus 1 is separated into a plurality of color light beams having different colors.

The separated red light R is reflected by the mirror 1650A, and becomes parallel through passing through the field lens 1670A, and thereafter enters the liquid crystal panel 1710A for red light modulation. The green light G becomes parallel through passing through the field lens 1670B, and thereafter enters the liquid crystal panel 1710B for green light modulation. The blue light B passes through the relay lens 1660A, and is reflected by the mirror 1650B, and further passes through the relay lens 1660B, and is reflected by the mirror 1650C. The blue light B reflected by the mirror 1650C becomes parallel through passing through the field lens 1670C, and thereafter enters the liquid crystal panel 1710C for modulation of the blue light B.

The liquid crystal panels 1710A, 1710B, and 1710C are electrically coupled to an unillustrated signal source (for example, a PC, etc.) that supplies an image signal including image information. The liquid crystal panels 1710A, 1710B, and 1710C modulate incident light in each pixel on the basis of supplied image signals of respective colors to respectively generate a red image, a green image, and a blue image. Modulated light beams of respective colors (the formed images) enter the dichroic prism 1720 to be synthesized. The dichroic prism 1720 superposes the light beams of respective colors incident from three directions on one another to synthesize the light beams, and outputs the synthesized light beams to the projection optical system 8.

The projection optical system 8 includes, for example, a plurality of lenses and the like. The projection optical system 8 enlarges light outputted from the image-forming unit 7 and projects the light on the screen 1500.

Although the description has been given with reference to the first to third embodiments, the modification examples 1 to 8, and the application examples, the present disclosure is not limited to the foregoing embodiments, etc., and may be modified in a variety of ways. For example, materials, etc., of respective members described in the foregoing embodiments, etc., are merely illustrative and non-limiting, and any other materials may be used.

Further, although the modification examples 1 to 7 are described as examples in which the respective requirements are combined with the configuration of the third embodiment, the present disclosure is not limited thereto, and the respective requirements may be combined with the configuration of the first embodiment or the second embodiment. Moreover, the modification examples 1 to 7 may be combined with each other. For example, the modification example 5 describes the example in which the three heat dissipation members 53A, a 53B, and 53C which are separately formed are used; however, the three heat dissipation members 53A, a 53B, and 53C may be integrally formed with the fins 532a, 532b, and 532c as with the modification example 1, for example. Further, the modification example 7 describes the transmissive phosphor wheel 10H in which the plurality of heat dissipation members 93 is provided only on the back surface (surface 91S2) side of the wheel substrate 91; however, the plurality of heat dissipation members may also be provided on the front face (surface 91S1) side of the wheel substrate 91 as with the modification example 6, for example.

Furthermore, as the projection display apparatus according to the present disclosure, an apparatus other than the foregoing projector may be configured. In addition, the light source apparatus according to the present disclosure may be used for an apparatus other than the projection display apparatus. For example, the light source apparatus 1 according to the present disclosure may be used for illumination, and is applicable to a light source for a headlight of an automobile or a light source for illumination, for example.

It is to be noted that the present technology may have the following configurations. According to the technology having the following configurations, it becomes possible to lower the temperature of the phosphor layer by the thermal diffusion effect while suppressing the increase in weight. Accordingly, it is possible to improve the heat dissipation efficiency. It is to be noted that the effects described herein are not necessarily limiting, and any of the effects described in the present disclosure may be provided.

(1)
  A light source apparatus including:
  a supporting substrate including a phosphor layer on one surface;
  a driver that causes the supporting substrate to be rotationally driven;
  a first supporting member that is opposed to another surface opposite to the one surface of the supporting substrate;
  a plurality of first heat dissipation members each having heat dissipation performance different from each other depending on a distance from the phosphor layer, the plurality of first heat dissipation members being provided concentrically on the other surface of the supporting substrate; and
  a plurality of second heat dissipation members provided concentrically on a surface, of the plurality of first supporting members, that is opposed to the supporting substrate, the plurality of second heat dissipation members being disposed alternately with the plurality of first heat dissipation members.

(2)
  The light source apparatus according to (1), in which, among the plurality of first heat dissipation members, a first heat dissipation member in proximity to the phosphor layer has higher heat dissipation performance than the heat dissipation performance of the other first heat dissipation member or the heat dissipation performance of each of the other first heat dissipation members.

(3)
  The light source apparatus according to (2), in which a thickness of the first heat dissipation member in proximity to the phosphor layer is relatively greater than a thickness of the other first heat dissipation member or thicknesses of the other first heat dissipation members.

(4)
  The light source apparatus according to (2) or (3), in which thicknesses of the plurality of first heat dissipation members decrease as distances from the phosphor layer increase.

(5)
  The light source apparatus according to any one of (2) to (4), in which a length of the first heat dissipation member in proximity to the phosphor layer is relatively greater than a length of the other first heat dissipation member or lengths of the other first heat dissipation members.

(6)
  The light source apparatus according to any one of (2) to (5), in which heights of the plurality of first heat dissipation members decrease as distances from the phosphor layer increase.

(7)
  The light source apparatus according to any one of (1) to (6), in which the supporting substrate and the plurality of first heat dissipation members are separately formed.

(8)
  The light source apparatus according to any one of (1) to (6), in which the plurality of first heat dissipation members is integrally formed with the supporting substrate.

(9)
  The light source apparatus according to any one of (1) to (8), in which the plurality of first heat dissipation members is disposed to avoid a region in which the phosphor layer is formed.

(10)
  The light source apparatus according to any one of (1) to (9), in which
  the phosphor layer has an annular shape, and
  the light source apparatus further includes
    one or a plurality of third heat dissipation members that is provided concentrically with the phosphor layer on the one surface of the supporting substrate,
    a second supporting member that is opposed to the one surface of the supporting substrate, and
    one or a plurality of fourth heat dissipation members that is opposed to the one or plurality of third heat dissipation members, the one or plurality of fourth heat dissipation members being disposed on a surface, of the second supporting member, that is opposed to the supporting substrate.

(11)
  The light source apparatus according to (10), in which, among the plurality of third heat dissipation members, a third heat dissipation member in proximity to the phosphor layer has higher heat dissipation performance than the heat dissipation performance of the other third heat dissipation member or the heat dissipation performance of each of the other third heat dissipation members.

(12)

The light source apparatus according to (11), in which a thickness of the third heat dissipation member in proximity to the phosphor layer is relatively greater than a thickness of the other third heat dissipation member or thicknesses of the other third heat dissipation members.

(13)

The light source apparatus according to (11) or (12), in which thicknesses of the plurality of third heat dissipation members decrease as distances from the phosphor layer increase.

(14)

The light source apparatus according to any one of (11) to (13), in which a length of the third heat dissipation member in proximity to the phosphor layer is relatively greater than a length of the other third heat dissipation member or lengths of the other third heat dissipation members.

(15)

The light source apparatus according to any one of (11) to (14), in which heights of the plurality of third heat dissipation members decrease as distances from the phosphor layer increase.

(16)

The light source apparatus according to any one of (10) to (15), in which the first supporting member and the second supporting member are included in a housing, the housing containing the supporting substrate including the phosphor layer, the plurality of first heat dissipation members, and the one or plurality of third heat dissipation members.

(17)

The light source apparatus according to (16), in which the housing further includes an external heat dissipation structure.

(18)

The light source apparatus according to (16) or (17), in which the housing has a sealed structure.

(19)

The light source apparatus according to any one of (16) to (18), in which the housing further has helium sealed therein.

(20)

A projection display apparatus including:
a light source apparatus;
an image generation optical system that modulates light from the light source apparatus on a basis of an inputted image signal to generate image light; and
a projection optical system that projects the image light generated in the image generation optical system,
the light source apparatus including
a supporting substrate including a phosphor layer on one surface,
a driver that causes the supporting substrate to be rotationally driven,
a first supporting member that is opposed to another surface opposite to the one surface of the supporting substrate,
a plurality of first heat dissipation members each having heat dissipation performance different from each other depending on a distance from the phosphor layer, the plurality of first heat dissipation members being provided concentrically on the other surface of the supporting substrate, and
a plurality of second heat dissipation members provided concentrically on a surface, of the plurality of first supporting members, that is opposed to the supporting substrate, the plurality of second heat dissipation members being disposed alternately with the plurality of first heat dissipation members.

This application claims the benefit of Japanese Priority Patent Application JP2019-108135 filed with the Japan Patent Office on Jun. 10, 2019, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. A light source apparatus, comprising:
a supporting substrate including a phosphor layer on one surface;
a driver that causes the supporting substrate to be rotationally driven;
a first supporting member that is opposed to another surface opposite to the one surface of the supporting substrate;
a plurality of first heat dissipation members each having heat dissipation performances different from each other depending on a distance from the phosphor layer, the plurality of first heat dissipation members being provided concentrically on the other surface of the supporting substrate; and
a plurality of second heat dissipation members provided concentrically on a surface of the first supporting member that is opposed to the supporting substrate, the plurality of second heat dissipation members being disposed alternately with the plurality of first heat dissipation members.

2. The light source apparatus according to claim 1, wherein, among the plurality of first heat dissipation members, a first heat dissipation member in proximity to the phosphor layer has a higher heat dissipation performance than a heat dissipation performance of each of the other first heat dissipation members.

3. The light source apparatus according to claim 2, wherein a thickness of the first heat dissipation member in proximity to the phosphor layer is relatively greater than a thickness of each of the other first heat dissipation members.

4. The light source apparatus according to claim 2, wherein thicknesses of the plurality of first heat dissipation members decrease as distances from the phosphor layer increase.

5. The light source apparatus according to claim 2, wherein a length of the first heat dissipation member in proximity to the phosphor layer is relatively greater than a length of each of the other first heat dissipation members.

6. The light source apparatus according to claim 2, wherein heights of the plurality of first heat dissipation members decrease as distances from the phosphor layer increase.

7. The light source apparatus according to claim 1, wherein the supporting substrate and the plurality of first heat dissipation members are separately formed.

8. The light source apparatus according to claim 1, wherein the plurality of first heat dissipation members is integrally formed with the supporting substrate.

9. The light source apparatus according to claim 1, wherein the plurality of first heat dissipation members is disposed to avoid a region in which the phosphor layer is formed.

10. The light source apparatus according to claim 1, wherein the phosphor layer has an annular shape, and the light source apparatus further includes:

one or a plurality of third heat dissipation members that is provided concentrically with the phosphor layer on the one surface of the supporting substrate;

a second supporting member that is opposed to the one surface of the supporting substrate; and one or a plurality of fourth heat dissipation members that is opposed to the one or a plurality of third heat dissipation members, the one or a plurality of fourth heat dissipation members being disposed on a surface, of the second supporting member that is opposed to the supporting substrate.

11. The light source apparatus according to claim 10, wherein, among the plurality of third heat dissipation members, a third heat dissipation member in proximity to the phosphor layer has a higher heat dissipation performance than a heat dissipation performance of each of the other third heat dissipation members.

12. The light source apparatus according to claim 11, wherein a thickness of the third heat dissipation member in proximity to the phosphor layer is relatively greater than a thickness of each of the other third heat dissipation members.

13. The light source apparatus according to claim 11, wherein thicknesses of the plurality of third heat dissipation members decrease as distances from the phosphor layer increase.

14. The light source apparatus according to claim 11, wherein a length of the third heat dissipation member in proximity to the phosphor layer is relatively greater than a length of each of the other third heat dissipation members.

15. The light source apparatus according to claim 11, wherein heights of the plurality of third heat dissipation members decrease as distances from the phosphor layer increase.

16. The light source apparatus according to claim 10, wherein the first supporting member and the second supporting member are included in a housing, the housing containing the supporting substrate including the phosphor layer, the plurality of first heat dissipation members, and the one or a plurality of third heat dissipation members.

17. The light source apparatus according to claim 16, wherein the housing further includes an external heat dissipation structure.

18. The light source apparatus according to claim 16, wherein the housing has a sealed structure.

19. The light source apparatus according to claim 16, wherein the housing further has helium sealed therein.

20. A projection display apparatus, comprising:

a light source apparatus;

an image generation optical system that modulates light from the light source apparatus on a basis of an inputted image signal to generate image light; and a projection optical system that projects the image light generated in the image generation optical system, the light source apparatus including:

a supporting substrate including a phosphor layer on one surface;

a driver that causes the supporting substrate to be rotationally driven;

a first supporting member that is opposed to another surface opposite to the one surface of the supporting substrate;

a plurality of first heat dissipation members each having heat dissipation performances different from each other depending on a distance from the phosphor layer, the plurality of first heat dissipation members being provided concentrically on the other surface of the supporting substrate; and a plurality of second heat dissipation members provided concentrically on a surface of the first supporting member that is opposed to the supporting substrate, the plurality of second heat dissipation members being disposed alternately with the plurality of first heat dissipation members.

* * * * *